(12) United States Patent
Ma

(10) Patent No.: US 11,422,623 B2
(45) Date of Patent: Aug. 23, 2022

(54) WRIST WORN COMPUTING DEVICE CONTROL SYSTEMS AND METHODS

(71) Applicant: Interlake Research, LLC, Bellevue, WA (US)

(72) Inventor: Yanjun Ma, Bellevue, WA (US)

(73) Assignee: Interlake Research, LLC, Bellevue, WA (US)

( * ) Notice: Subject to any disclaimer, the term of this patent is extended or adjusted under 35 U.S.C. 154(b) by 0 days.

(21) Appl. No.: 17/074,975

(22) Filed: Oct. 20, 2020

(65) Prior Publication Data

US 2021/0124417 A1    Apr. 29, 2021

Related U.S. Application Data

(60) Provisional application No. 62/924,739, filed on Oct. 23, 2019.

(51) Int. Cl.
| | |
|---|---|
| *G06F 15/00* | (2006.01) |
| *G06F 3/14* | (2006.01) |
| *G06F 3/048* | (2013.01) |
| *G06F 3/01* | (2006.01) |
| *G06F 3/0346* | (2013.01) |
| *G06F 3/04886* | (2022.01) |
| *G06F 3/0482* | (2013.01) |
| *G06F 3/0484* | (2022.01) |
| *G06F 3/04842* | (2022.01) |

(52) U.S. Cl.
CPC .............. *G06F 3/014* (2013.01); *G06F 3/017* (2013.01); *G06F 3/0346* (2013.01); *G06F 3/0482* (2013.01); *G06F 3/0484* (2013.01); *G06F 3/04842* (2013.01); *G06F 3/04886* (2013.01)

(58) Field of Classification Search
None
See application file for complete search history.

(56) References Cited

U.S. PATENT DOCUMENTS

| | | | | |
|---|---|---|---|---|
| 1,070,933 | A * | 8/1913 | Wilson ................... | B29C 53/562 493/275 |
| 6,733,462 | B1 * | 5/2004 | Frick ................... | A61B 5/02156 600/499 |
| 7,834,849 | B2 * | 11/2010 | Hunleth ................ | G06F 3/0482 345/158 |
| 8,344,862 | B1 * | 1/2013 | Donham ............. | H04M 1/7243 340/407.1 |
| 8,624,836 | B1 * | 1/2014 | Miller ................... | G06F 3/0426 345/157 |
| 9,310,895 | B2 * | 4/2016 | Hegde ...................... | G06F 3/005 |
| 9,792,787 | B2 * | 10/2017 | Kosonen ............... | H04M 19/04 |
| 10,019,074 | B2 * | 7/2018 | Hegde ................... | G06F 3/0428 |

(Continued)

OTHER PUBLICATIONS

HS Yeo et al., WRIST: Watch-Ring Interaction and Sensing Technique for Wrist Gestures and Macro-Micro Pointing, 2019 (Year: 2019).*

*Primary Examiner* — Jordany Nunez

(57) ABSTRACT

Systems and methods for operating computing devices, including providing point-click, drag and drop, pan and zoom, and text entry operations, without using physical computer mouse and keyboard are provided. Multiple types of sensors on a wristband may be used to detect different hand/finger gestures for calibration, activation, performance of mouse or text entry functionalities, and/or termination.

20 Claims, 18 Drawing Sheets

(56) References Cited

U.S. PATENT DOCUMENTS

| | | | |
|---|---|---|---|
| 10,070,799 B2* | 9/2018 | Ang | A61B 5/389 |
| 11,287,886 B1* | 3/2022 | Harb | H04R 1/1016 |
| 2004/0034505 A1* | 2/2004 | Kimble | G06F 3/014 |
| | | | 702/182 |
| 2009/0295713 A1* | 12/2009 | Piot | G06F 3/03543 |
| | | | 345/156 |
| 2010/0222711 A1* | 9/2010 | Lajeunesse | A61B 5/1124 |
| | | | 600/595 |
| 2011/0141053 A1* | 6/2011 | Bulea | G06F 3/0481 |
| | | | 345/174 |
| 2015/0124566 A1* | 5/2015 | Lake | G06F 3/014 |
| | | | 368/10 |
| 2015/0309582 A1* | 10/2015 | Gupta | G06F 3/017 |
| | | | 345/156 |
| 2016/0202770 A1* | 7/2016 | Hegde | G06F 3/033 |
| | | | 345/175 |
| 2016/0210826 A1* | 7/2016 | Kosonen | A61B 5/024 |
| 2016/0246441 A1* | 8/2016 | Westerman | G06F 3/0446 |
| 2016/0306422 A1* | 10/2016 | Parham | G06F 3/012 |
| 2017/0249009 A1* | 8/2017 | Parshionikar | G06K 9/00315 |
| 2017/0269697 A1* | 9/2017 | Vaughn | G06F 3/017 |
| 2018/0150033 A1* | 5/2018 | Lake | G04G 21/08 |
| 2018/0153430 A1* | 6/2018 | Ang | G06F 1/163 |
| 2018/0154140 A1* | 6/2018 | Bouton | A61B 5/389 |
| 2019/0250708 A1* | 8/2019 | Gupta | G06F 3/014 |
| 2020/0152312 A1* | 5/2020 | Connor | A61B 5/11 |
| 2020/0276438 A1* | 9/2020 | Bouton | A61B 5/1127 |
| 2021/0232225 A1* | 7/2021 | Cipoletta | G06F 3/017 |

\* cited by examiner

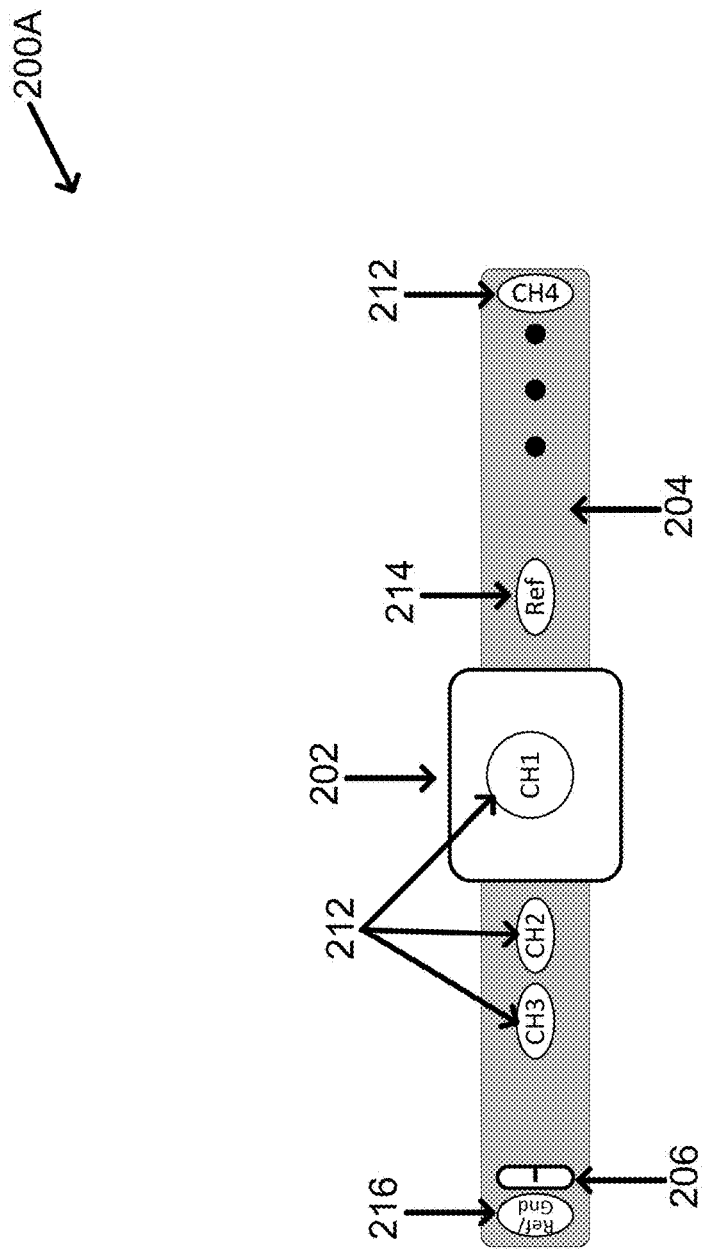

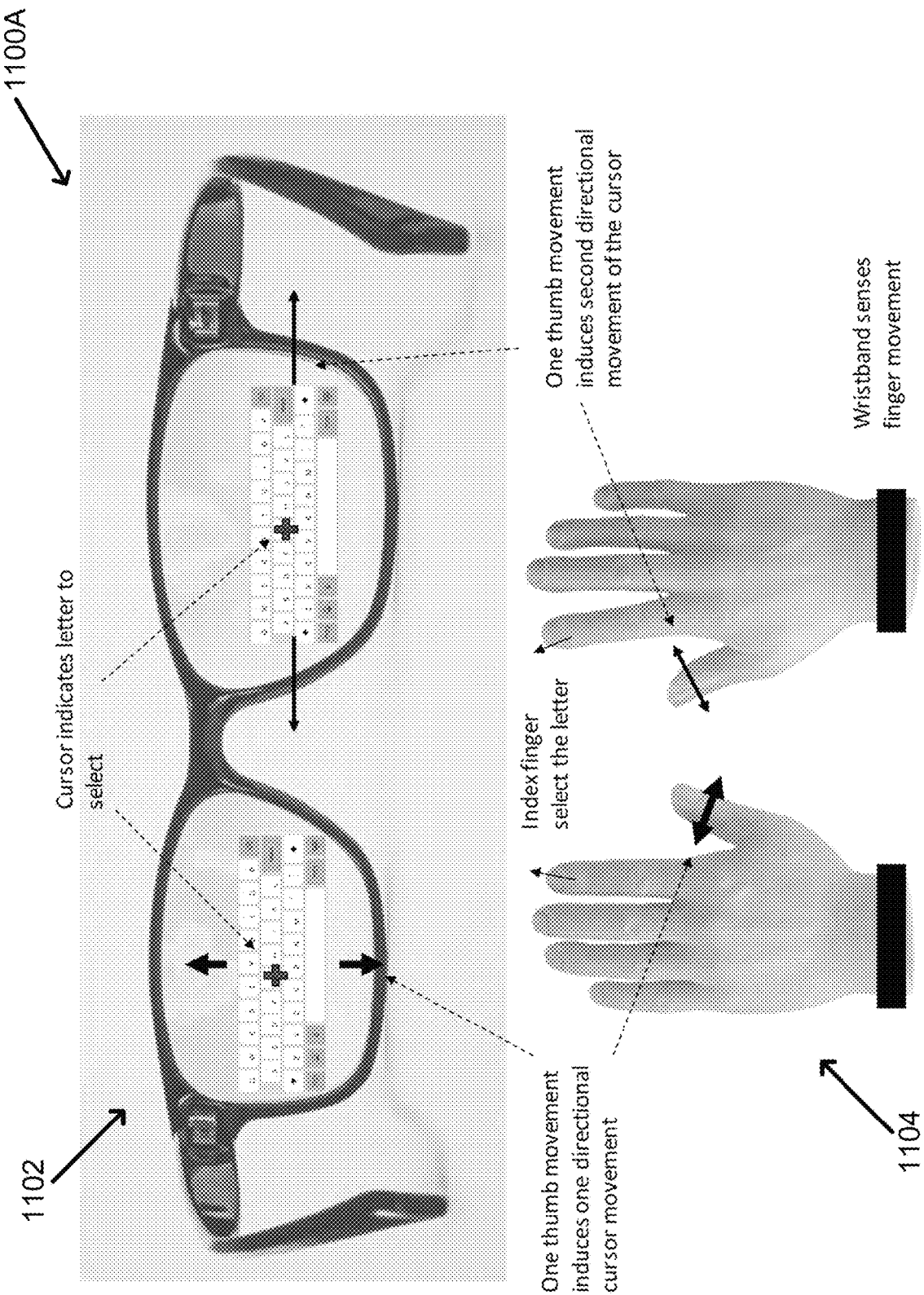

US 11,422,623 B2

WRIST WORN COMPUTING DEVICE CONTROL SYSTEMS AND METHODS

CROSS REFERENCE TO RELATED APPLICATIONS

This application claims the benefit of U.S. Provisional Patent Application Ser. No. 62/924,739 filed on Oct. 23, 2019. The disclosures of the provisional patent application are hereby incorporated by reference in their entireties.

BACKGROUND

Unless otherwise indicated herein, the materials described in this section are not prior art to the claims in this application and are not admitted to be prior art by inclusion in this section.

With the proliferation of computing and networking technologies, most devices in daily work and home lives have become computerized, many working based on an embedded or remote operating system and having components and features similar to regular computers. In addition, regular computers such as desktop, laptop, or portable computers are being used ever increasingly. Operating computing devices without using keyboard or mouse/touchpad are desirable for many situations and systems. Potential applications including operating smart TVs, projectors, augmented reality (AR) glasses, virtual reality (VR) head mounted displays (HMD) without a physical remote control device, a keyboard and/or a mouse. An exemplary application is for a jogger to adjust the volume of the earbuds while running, without needing to take out the mobile phone.

SUMMARY

Briefly stated, embodiments are directed systems and methods for operating computing devices, including providing point-click, drag and drop, pan and zoom, and text entry operations, without using physical computer mouse and keyboard. In some examples, multiple types of sensors on a wristband may be used to detect different hand/finger gestures to perform mouse or text entry functionalities.

According to some examples, a method for controlling a cursor on a computer display using wrist embedded multimodal sensors may include detecting input signals from a plurality of sensors, where the plurality of sensors is grouped to sense movement of one or more of a wrist, a hand, or a finger, and each group comprises at least one sensor dynamically configured to detect one movement; preprocessing the detected input signals; and processing the preprocessed input signals to control one or more of a movement of a cursor along a direction on the computer display and a pointer action through a machine learning algorithm by translating the input signals to the one or more of the movement of the cursor and the pointer action.

According to other examples, the pointer action may be a click action. The method may also include activating the preprocessing and the processing upon detecting a predefined movement of the one or more of the wrist, the hand, or the finger. The computer display may be a head mounted display or an augmented reality (AR) display. The sensors may include one or more of an electromyogram (EMG) sensor, an optical sensor, an accelerometer, an inertial measurement unit (IMU), a capacitive sensor, a force sensor, a magnetic sensor, an acoustic sensor, or a camera.

According to further examples, the method may further include adaptively configuring one or more of the plurality of sensors through a machine learning model. Controlling the movement of the cursor along the direction may include controlling the movement of the cursor linearly, in a 2D plane, or in a 3D space. The method may also include enabling the plurality of sensors based on a machine learning model trained on usage history. The method may further include enabling the plurality of sensors based on a received notification. The finger may include a thumb, an index finger, a middle finger, a ring finger, and a little finger.

According to other examples, a method for text entry on a computer display using wrist worn multimodal sensors may include detecting input signals from a plurality of sensors, where the plurality of sensors is grouped to sense movement of one or more of a wrist, a hand, or a finger, and one or more groups comprise at least one sensor dynamically configured to detect a movement to control a movement of a cursor along a direction on the computer display, one group comprises at least one other sensor configured to detect a click action; preprocessing the detected input signals; processing the preprocessed input signals to control the movement of the cursor and the click action through a machine learning algorithm by translating the input signals to the one or more of the movement of the cursor and the click action; and providing a virtual keyboard on the computer display, where the movement of the cursor and the click action enable selection of characters and commands on the virtual keyboard.

According to some examples, the method may also include activating the preprocessing and the processing upon receiving a notification, based on usage history, or detecting a predefined movement of the one or more of the wrist, the hand, or the finger. The computer display may be a head mounted display or an augmented reality (AR) display. The sensors may include one or more of an electromyogram (EMG) sensor, an optical sensor, an accelerometer, an inertial measurement unit (IMU), a capacitive sensor, a force sensor, a magnetic sensor, an acoustic sensor, or a camera. The method may further include enabling one handed or two handed use of the virtual keyboard based on user selection.

According to further examples, a system for providing computer mouse functionality on a computer display using a wrist band embedded with multimodal sensors may include a plurality of sensors, where the plurality of sensors is affixed to watch and a wristband for the watch, the plurality of sensors is grouped to sense a movement of one or more of a wrist, a hand, or a finger, and each group comprises at least one sensor dynamically configured to detect the movement to control a movement of a cursor along a direction on the computer display. The system may also include a preprocessing unit configured to preprocess input signals from the plurality of sensors; and a processor. The processor may be configured to control the movement of the cursor and a pointer action through a machine learning algorithm by translating the input signals to the one or more of the movement of the cursor and the pointer action and calibrate the plurality of sensors by executing a calibration algorithm. The system may further include an adjustment unit configured to adjust contact tightness for the plurality of sensors based on input from one or more of the plurality of sensors.

According to other examples, the preprocessing unit may be configured to one or more of filter, digitize, or amplify the input signals. The processor may be further configured to provide a virtual keyboard on the computer display, where the movement of the cursor and the pointer action enable selection of characters and commands on the virtual keyboard. The processor may also be configured to activate the preprocessing unit and process the input signals upon receiving a notification, based on usage history, or detecting a predefined movement of the one or more of the wrist, the hand, or the finger. At least a subset of the plurality of sensors may be configured to provide redundancy to another subset of the plurality of sensors.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 2A, 2B, and 2C illustrate an exemplary implementation and placement of sensor electrodes on a watch band;

FIGS. 11A, 11B, and 11C illustrate examples of a system visually presenting a keyboard and using finger and wrist movements for text entry through the keyboard.

DETAILED DESCRIPTION

Figure 1A:
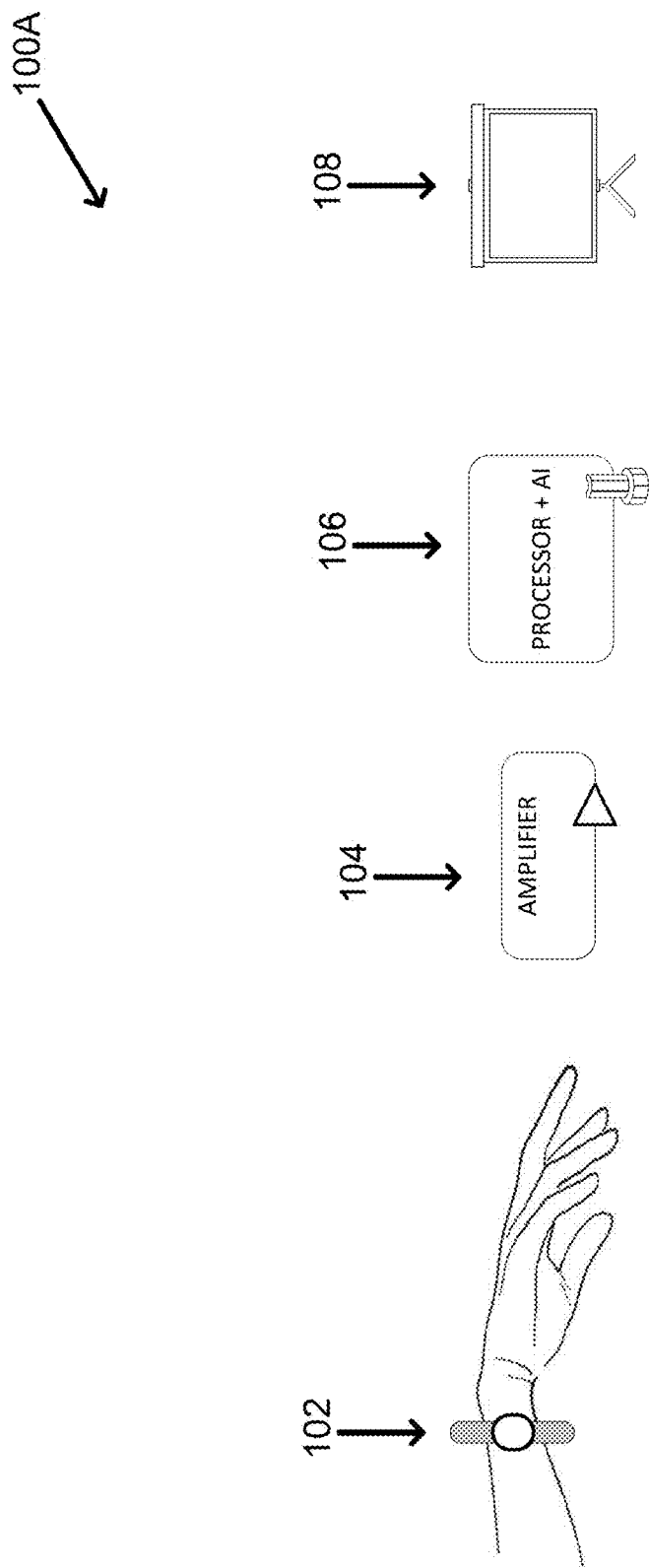
FIG. 1A is a conceptual diagram illustrating an example wrist worn system for operating computing devices.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

This disclosure is generally drawn, among other things, to methods, systems, and/or devices related to control of computing devices through a wrist worn mechanism.

Systems and methods for operating computing devices, including providing point-click, drag and drop, pan and zoom, and text entry operations, without using physical computer mouse and keyboard, are disclosed. The system comprises a wristband fitted with one or more sensors, including accelerometer, electromyogram (EMG), force, capacitive, optical (including near infrared) sensors, and magnetic sensors or the combination of these sensors, and associated signal processing and classification algorithms for sensing finger gestures and wrist movement.

For pointing, the sensors may sense the user's finger and wrist movement, which causes a cursor to move on a display. Multiple sensor types may be used, each sensor sensing different types of wrist/finger movement, to control the cursor movement in a given direction. For example, Sensor A may sense wrist movement type A and type B, to move the cursor in the first and second directions. While Sensor B may sense a different wrist/finger movement and move the cursor in the third direction. The magnitude of the movement can be made to be proportional to the magnitude or duration of the wrist or finger movement. The click action can be accomplished by a tapping or flexion/extension of a finger that can be detected by one or combination of the sensors.

For text entry, a virtual keyboard or a set of keys is displayed on a display, preferably an augmented reality head mounted display, for example AR glasses, a virtual reality, or mixed reality display. A pointer icon, which may be in the shape of a cursor or a virtual finger, overlaying on top of a virtual keyboard is controlled by hand gesture, which is detected by one or more of the following methods: computer vision, electromyography, mechanomyography, near infrared, or accelerometer worn on one or both wrist or on fingers, and moves within the display. A key may be highlighted when the pointer is near or on top of it. The key is selected (typed) with the move of a finger, for example the index finger or the thumb. One finger may do the selection (typing), similar to the case of typing on a mobile phone to enable typing with one hand. Or multiple fingers can do the typing, for example with both hands fitted with wristbands. Autocomplete techniques and language models can be used to assist in the typing.

Other uses of the wristband and the disclosed control method may include the volume up/down control of earphones; selection, zooming, and panning; menu selections; and disposition of notifications. The algorithms for translating the sensor signals to detected gestures signals may be adapted to learn in real time, to adapt to the user's preferences, and situations. For example, the detection threshold may be dynamically adjusted depending if the user is sitting quietly or is active. The sensors controlling each movement may be dynamically configured using machine learning to depend on use scenarios and sensor signal quality. For example, in one scenario while the user is sweating (e.g. from exercising) the EMG signal will be unreliable. In this case the optical signal may be used to control finger movement. While in another scenario, e.g. when ambient light is bright, the optical signal may be contaminated, the EMG signals may be used for finger movement. The adaption to the environment can be learned through machine learning techniques.

Wrist worn devices, such as watches or wristbands, with sensors can be designed to meet these needs. Conventional technologies employing single mode sensors, e.g., wristbands based on sensing electromyograph (EMG) or optical/infrared signals, have been used to detect hand gestures for manipulating a cursor. These methods often lack accuracy, often need periodic and lengthy calibration, and sometimes fail to perform the tasks under everyday wear. For example, EMG wristbands do not work well under sweaty conditions due to shorting of electrodes. EMG wristband also needs to be tightly worn and any shift of the bands may throw calibration off.

Disclosed designs and operating methods for incorporating multitudes of sensors in wristbands or watches for emulating mouse operations and text entries, including methods for the design and placement of sensors, calibration algorithms, and methods for use of the sensors including machine learning algorithms improve on existing technologies and provide unique aspects. Disclosed embodiments are simple to use and robust to environmental conditions. Using multiple types of sensors, each type may have more than one per wristband, to detect different hand gestures to perform mouse or text entry tasks. For example, EMG to detect thumb motion to control cursor in one direction, optical sensors to detect wrist motion to move cursor along the second direction, and accelerometer/IMU to detection a tap for click. Multiple types of sensors also add redundancy to the system, when one type of sensors does not work well, the second type of sensors may take over. By restricting the detection to simple gestures, embodiments are robust to shift of the band or sweating wrist or other environmental noise sources.

Figure 1B:
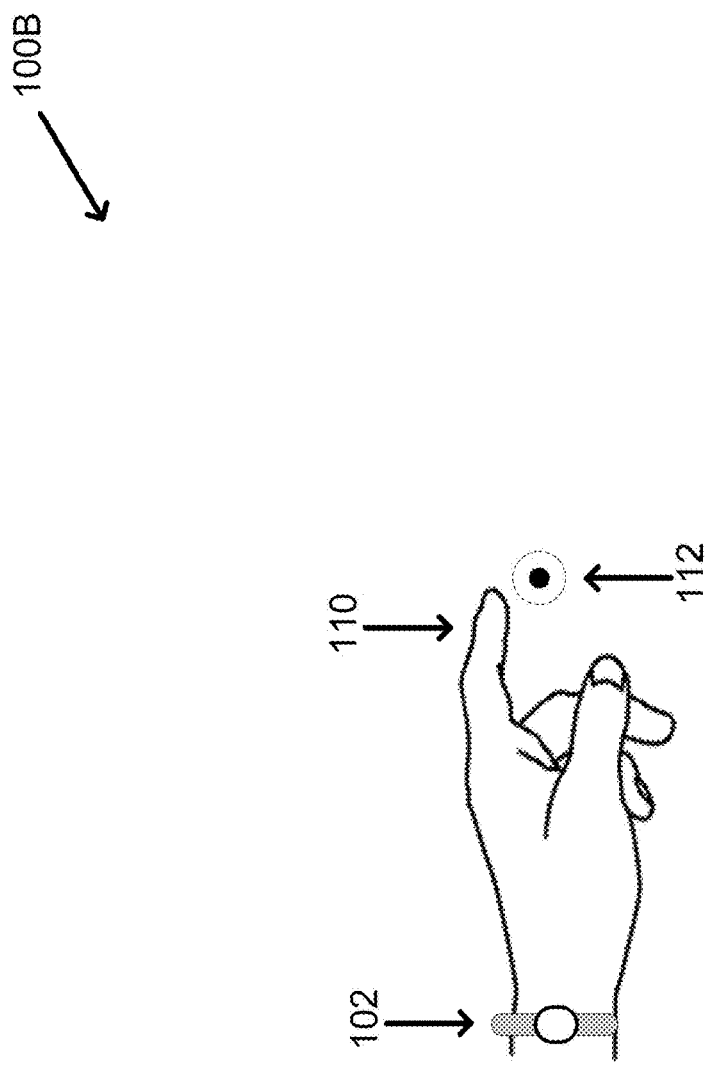
FIGS. 1B and 1C illustrate hand and finger gestures that can be used as commands.
Figure 1C:
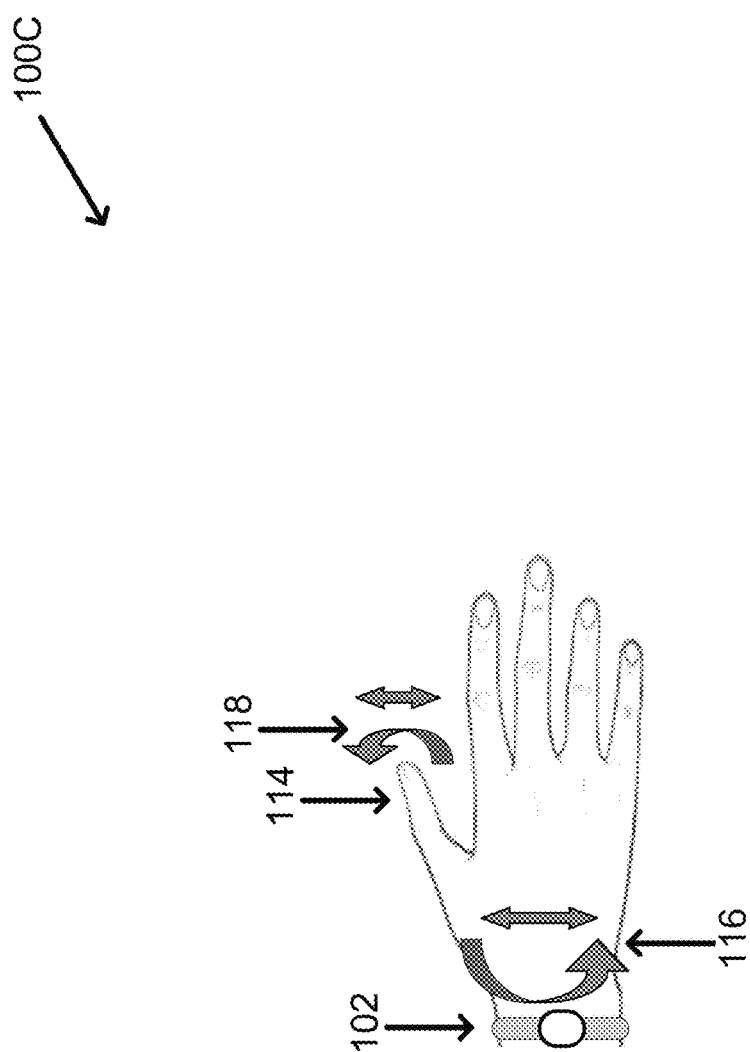

FIG. 1A is a conceptual diagram illustrating an example wrist worn system for operating computing devices, and FIGS. 1B and 1C illustrate hand and finger gestures that can be used as commands, arranged in accordance with at least some embodiments described herein.

Diagram 100A illustrates a wrist worn system using a watch 102 for operating a computing device for pointing and clicking of a cursor displayed on a display screen using finger gestures. Sensors, including electromyography (EMG), optical including infrared, force, capacitive, vision, accelerometers, are incorporated in the watch 102 and on the wristband to provide signals to the signal processing units. For the case of optical sensing, the sensor may comprise both photoemitters and detectors. Herein, the term "optode" is used to refer to a device that is capable of emitting or detecting light, including visible and infrared light, or having both capabilities. The signal processing units may include signal amplifiers, filters, digitizers, and machine learning classifiers. In a simplified overview, the signals from the sensors in and on the watch 102 may be amplified at an amplifier 104 (and pre-processed otherwise), and processed at a processor 106, which may employ machine learning techniques such as artificial intelligence (AI). The signals are responsive to hand gestures. The output of the signal processing pipeline is then fed to a computing unit, optionally processed through a machine learning classifier, and translated into the position of the cursor on the display. The output may include both analog quantities such as the amplitude of a filtered signal or discrete machine learning classification results, such as the flexion of an index finger.

In some examples, the sensors may be grouped into two or more groups. The first group of sensors may be arranged to detect a certain type of hand gesture, e.g. a thumb movement 114 to move the cursor along a first direction 118 on the screen 108, e.g. horizontal as shown in diagram 100C. The second group of sensors may be designed to detect a second type of hand gesture, e.g. a wrist movement 116, to move the cursor along a second direction on the screen, e.g. vertical. The combined finger and wrist movement can then be detected to move the cursor on the screen.

A third sensor group, for example, an accelerometer or inertial measurement unit (IMU), may be used to detect a third type of gestures, e.g. a tap 112 of the fingers 110 and to be recognized as a click of the cursor as shown in diagram 100B. For pointing in three-dimension typical of an augmented reality application, additional sensor group may be used to control the cursor movement in the third direction.

Sensors in different groups may be of different types. For example, sensors in Group A may be EMG sensors, while sensors in Group B may be optical or infrared sensors. Or the sensors types may be mix and matched to optimize the performance, according to machine learning models. Each sensor group may detect different type of hand gestures. For example, sensors in Group A may sense wrist movement Type A and Type B, to move the cursor in the first and second directions. While sensors in Group B may sense a different wrist/finger movement and move the cursor in the third direction. In one example, sensors in Group A may be an accelerometer or inertial measurement unit (IMU) and wrist movement Type A may be a wrist rotation, and wrist movement Type B may be a wrist move up or down. Sensors in Group B may be an optical sensor (including the light source and detector) and the wrist movement may be a wrist deviation movement, i.e. wrist adduction and abduction. Sensors in Group C may be an EMG sensor that sensor a finger movement, e.g. an index finger extension or a thumb extension. The combination of these functionality can achieve the functionalities of a computer mouse, such as point and click, drag and drop, and pan and zoom. Text entry using the system can be accomplished by moving a cursor over a virtual keyboard on the screen using the thumb and wrist movement to a desired letter. The selection can be accomplished with the tap of a finger. More details on implementing these functions will be detailed in later sections.

The algorithms for translating the sensor signals to detected gesture signals can be adapted to learn in real time, to adapt to the user's preferences, and use situations. For example, the detection threshold may be dynamically adjusted depending if the user is sitting quietly or is active. The sensors controlling each movement may be dynamically configured using machine learning depending on use scenarios and sensor signal quality. For example, in one scenario while the user is sweating (e.g. from exercising), or the contact impedance with the skin may be too high, the EMG signal quality will be unreliable. In this case the weight of the EMG signals may be scaled down and other sensor signals, for example, capacitive or optical signals, may be scaled up optical signal. While in another scenario, e.g. when ambient light is bright, the optical signal may be contaminated, the EMG signals may be used for finger movement. The configuration of sensors in each sensor groups can also be proportionally adjusted based on machine learning models trained in different usage cases.

Figure 2B:
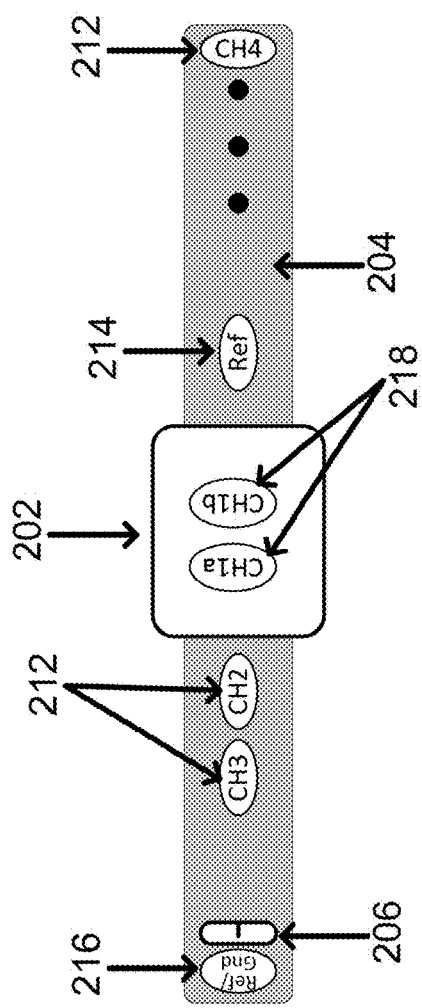
Figure 2C:
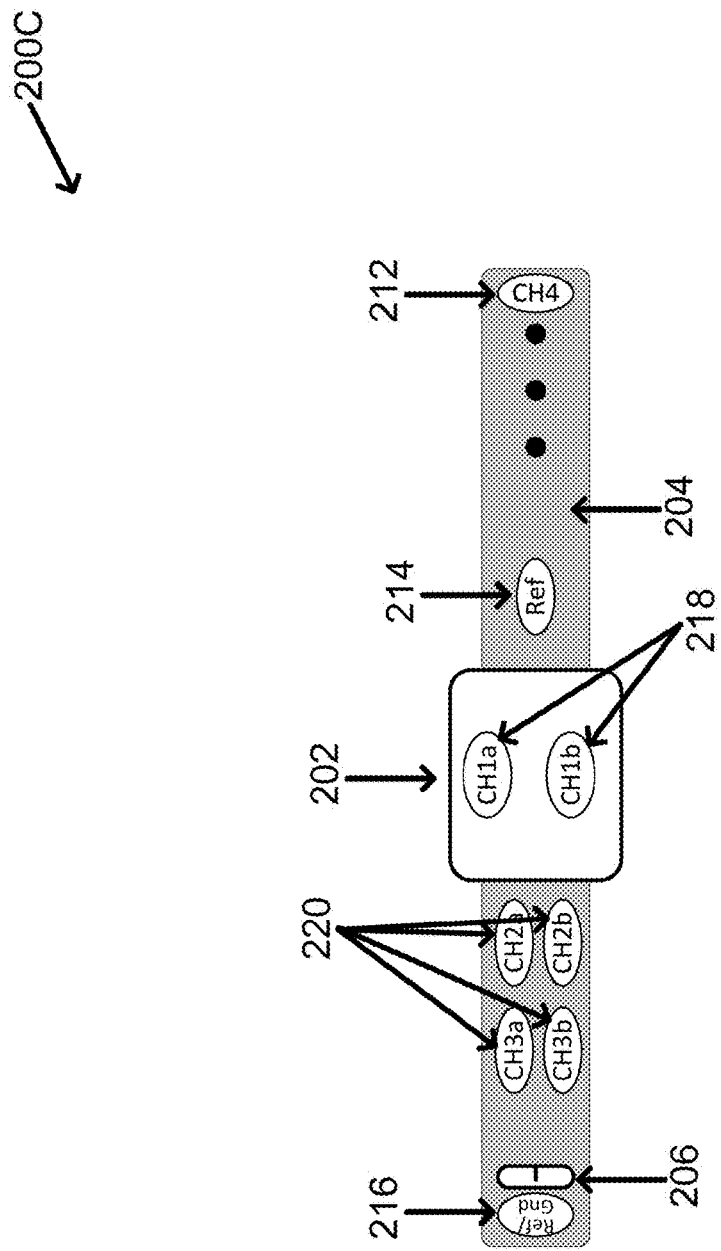

FIGS. 2A, 2B, and 2C illustrate an exemplary implementation and placement of sensor electrodes on a watch band, arranged in accordance with at least some embodiments described herein.

Embodiments incorporate multiple types of sensors, including accelerometers or IMUs, electromyogram (EMG), force, capacitive, optical (including near infrared) sensors, and magnetic sensors or the combination of these sensors. An exemplary implementation and placement of sensor electrodes is shown in diagram 200A on a watch 202 and its wristband 204. The electrodes can be used to collect EMG signals. They may also be used to collect other electrical signals such as electrical impedance for electrical impedance tomography (EIT) or for electrodermal activity (EDA). There are many variations of designs that can integrate different number and types of sensors on wristbands. Diagram 200A shows a watch with placement for 6-electrodes. Two of the electrodes may be used as the reference 214 and ground 216 electrode, respectively, leaving location for four possible active electrodes 212 for a 4-channel EMG. The EMG electrode (e.g. CH1) maybe made of transparent, conducting materials, so that they can be coated or placed on top of the optical sensors to enable simultaneous collection of both EMG and optical signals.

Alternatively, electrode for Channel 1 may be further divided into two, or even 4 sub-electrodes. Diagrams 200B and 200C show the configuration where CH-1 is divided into 2-electrodes, Ch1a and CH1b that are arranged either along or orthogonal to the direction of the band. Electrodes CH1a and CH1b, CH2a and CH2b, CH3a and CH3b, may form differential pairs in order to reduce the noise.

The electrodes may be placed to maintain maximum contact with the skin when the watch is worn in a natural and comfortable manner. Some examples may opt to deploy only one EMG channel on a wristband, for example, CH1 in diagram 200A. This may be due to some users preferring to wear the watch very loosely and that other channels may not be reliable. But CH1, due to its large surface area and located on the back of the watch, can generally have good contact with the skin. Multiple contact points, e.g. places where CH2 and CH3 in diagram 200B, 200C, may be connected and used as a single channel to guarantee electrical contact with the skin.

Figure 3:
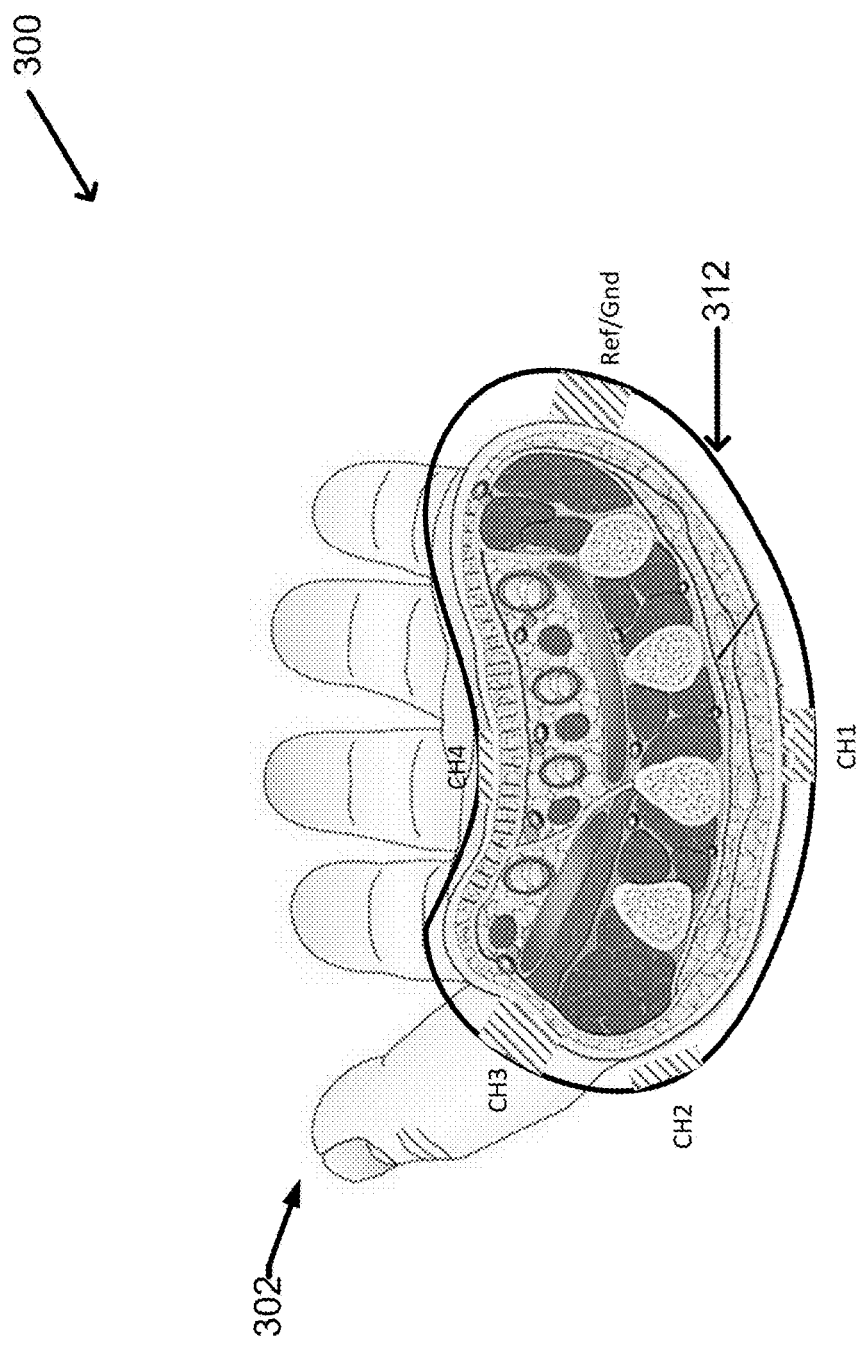
FIG. 3 illustrates example band and electrode placement on a cross-section of a wrist.

FIG. 3 illustrates example band and electrode placement on a cross-section of a wrist, arranged in accordance with at least some embodiments described herein.

Diagram 300 illustrates the cross section of the wristband 312 on a wrist of the hand 302. The EMG sensors are roughly aligned to a few relevant muscle groups to facilitate the detection of the movement of these muscles when the user perform certain hand gestures. For example, CH1 is placed on the back of the watch and is directly placed on the extensor muscles of the finger, for example, extensor digitorum and extensor digiti minimi. CH4 is placed on top of flexor digitorum superficial and can be used to detect the flexion of the fingers. On the other hand, CH2 and CH3 are close to the thumb and wrist muscles, for example, abductor pollicis longus (abductor of the thumb), extensor pollicis brevis (extension of the thumb), extensor carpi radialis brevis (extension of the wrist). To take advantage of the shape of the wrist, the curvature of wristband can be designed to lock the position of the electrode with respect to the wrist. For example, the back of the wrist is generally fairly flat and is the conventional place for the watch, it is used to place for the CH1 electrode of the EMG. On the other hand, the curve of the wrist can be used to lock the location for CH2 and CH3 electrode. Users with different wrist sizes may be fitted with band of different length to make sure the channels are in the approximate locations that are most sensitive to the above-mentioned muscles. Other sensors including force/pressure, accelerometer/IMU, radiofrequency, and optical/IR optodes may be implemented in the similar manner. In particular, accelerometer or IMUs are typically inside smart watches as well. The optical/NIR sensors can be used to generate diffused optical tomography (DOT). Accelerometers or contact microphones may also be used for collecting mechanomyography (MMG) signals as well as for acoustic imaging.

In one example, four optodes may be placed in the locations labeled by CH1, CH2, GND/Ref, and CH4. These optodes, e.g., using red and/or infrared LEDs as light source and photodiodes as detectors, may be used to monitor the wrist and finger movement and in turn drive a cursor on a display screen. In another embodiment, multiple accelerometers may be placed on four sides of the watch to detect more precisely the movement, including the twist of the wrist or arm. Signals from the various sensor types can be used alone or in combination with each other to provide complementary information on the finger or wrist movement. Sensors may be grouped to sense the types of hand gestures (wrist and finger movements).

Figure 4:
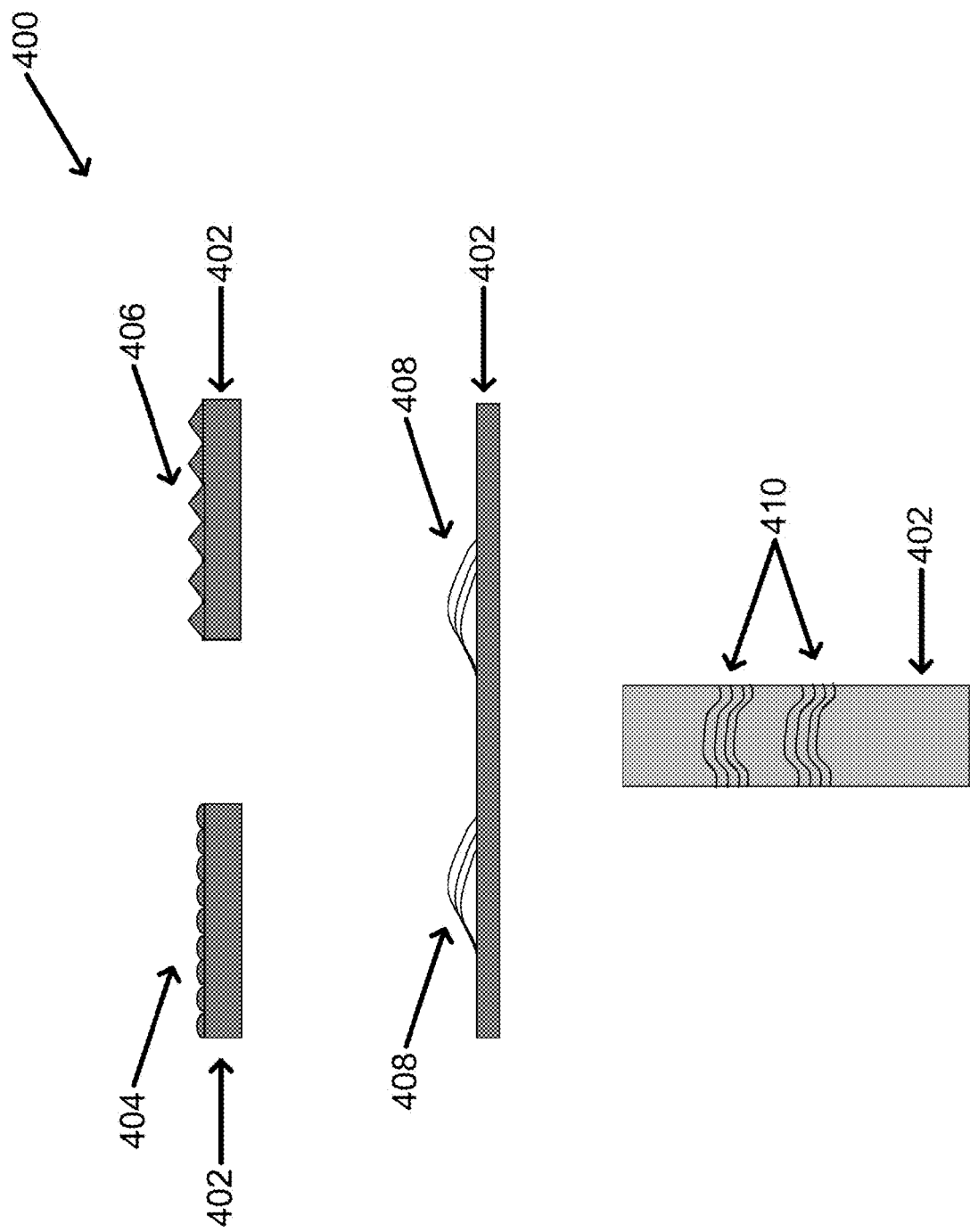
FIG. 4 illustrates example electrode designs for improved contact.

FIG. 4 illustrates example electrode designs for improved contact, arranged in accordance with at least some embodiments described herein.

For high quality signal, it is important to ensure good contact between the skin and the sensors. This is true for virtually all sensors. Electrical sensors such as for electromyogram (EMG) and electrical impedance tomography (EIT), need electrodes to be in good electrical contact with the skin. Other non-electrical sensors, such as optodes, pressure, also need good and close contact with the skin. To ensure good contact while being comfortable to wear, the shape design and materials choices of the sensors are critical. For accelerometer or contact microphone for mechanomyogram (MMG) sensors, good mechanical coupling is also necessary. Close contact between the skin and optodes is also necessary to reduce the effect of ambient light. For the EMG and EIT electrodes, the electrodes may be designed to be bumpy as shown in diagram 400. Bumps 404 and 406 on the wristband 402 may have different shapes such as cone, sphere, triangle, strips, etc., and add redundancy and may help maintain good electrical contact between the electrode and the skin. The electrodes may also be made in the shape of suction cups, or of materials that self-adhere to the skin, to help with the contact with the skin.

Electrode designs 408 and 410 use springs. Multiple springs are used to ensure some of the springs will make contact with the skin for hairy skins, for example. These electrodes may serve multiple sensors. For example, the EMG electrodes can be used to measure the impedance for EIT. EMG signals can be collected with non-conductive, e.g. capacitively coupled, electrodes. These types of sensors can also be used to measure capacitance between the electrode and the skin. These capacitance measurements can be used for measuring minute displacements of the skin. The sensors can then be used monitor the movement of the wrist.

Figure 5:
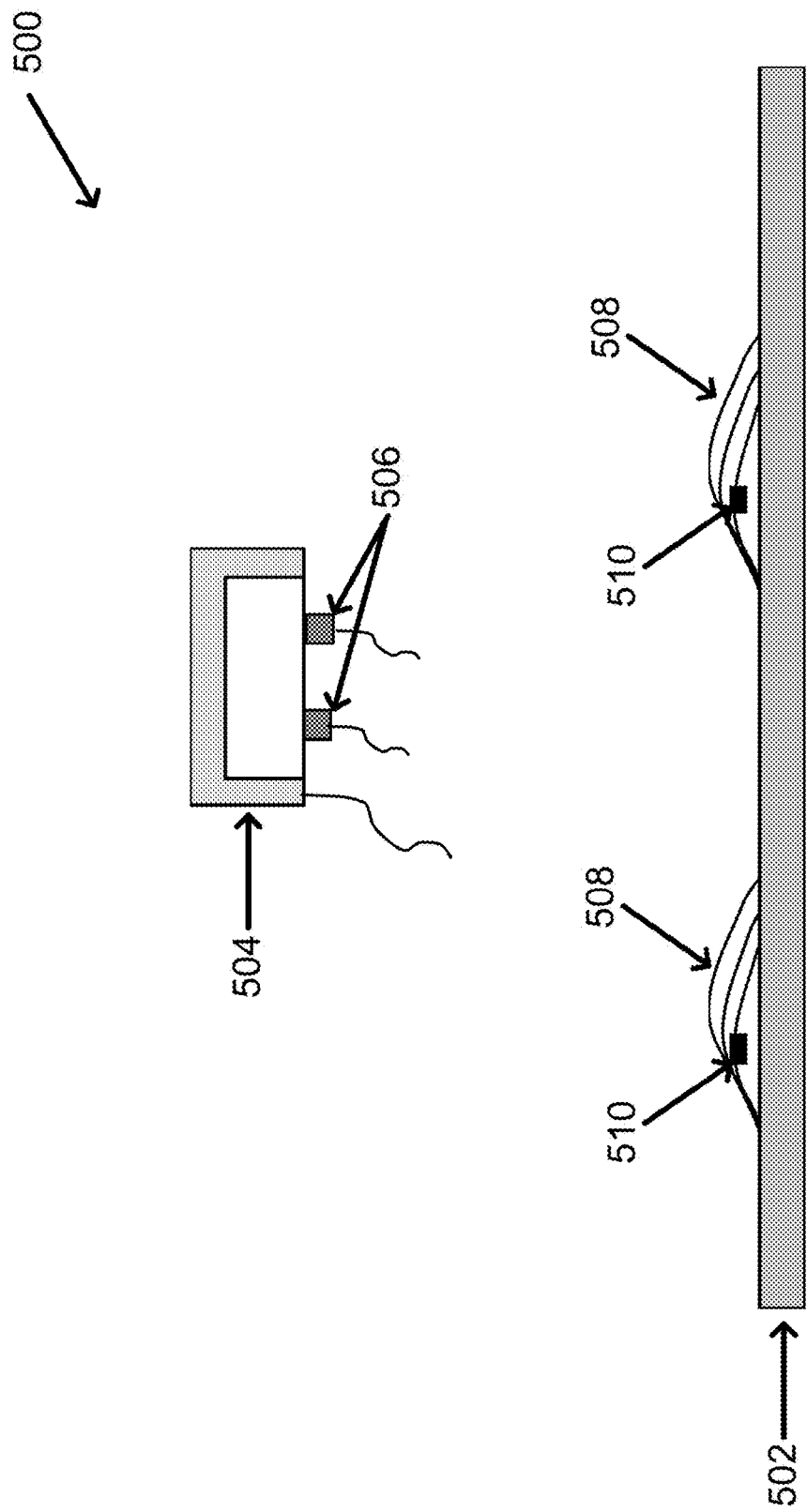
FIG. 5 illustrates example integrated sensors for multimodal sensing.

FIG. 5 illustrates example integrated sensors for multimodal sensing, arranged in accordance with at least some embodiments described herein.

Multiple types of sensors maybe integrated into a single package. Diagram 500 shows an integrated sensor including an electrode 504 and two optodes 506. The electrode 504 is provided by an optically transparent conductive material, such as Indium Oxide, that permits the light to go through. This type of integrated electrode/optode can be used to collect EMG, ECG, EIT signals together with PPG or functional near infrared (fNIR) signals. An alternative arrangement is to have electrode in a ring-shaped structure and optodes in the center of the ring, while the outer ring makes electrical contact with the skin. An accelerometer or contact microphone maybe integrated with the electrodes to enable the collection of MMG signal simultaneously as EMG and NIRS signals. For example, diagram 500 also shows that by attaching an accelerometer 510 to one of the springs 508 of diagram 400, an integrated electrode and accelerometer sensor may be achieved. The accelerometer can be used to measure the mechanomyography (MMG) at the same place as the EMG measurement, as well as detecting other vibrations such as the tapping of fingers. Multiple types of sensors may be configured to provide complementary information to assist in recognizing the hand/finger gestures under all use conditions. As an example, DOT, EIT, may be used to calibrate the information obtained from EMG against the movement of the wristband on the wrist. DOT and MMG may provide complementary information to help with gesture recognition when electrical contact cannot be maintained due to skin condition (e.g. hairy skins or dry skins).

For the comfort of the user, the electrode may be made of soft conducting materials. For example, the electrode maybe made of doped silicone gel. Silicone gel is a man-made polymeric material made up of silicone polydimethyl siloxane (PDMS). Its unique chemical composition results in a soft gel-like physical form. Biocompatible and chemically mild, silicone gel is relatively moisture and oxygen permeable. The dopants can be carbon black or carbon nanotube, or it can be metal particles such as silver. Force or pressure sensors, such as capacitive force sensor or force sensitive resistor may be used in combination with EMG sensor to measure the deformation of the wrist that can be used, in combination with machine learning, to detect different hand/finger gestures.

Figure 6:
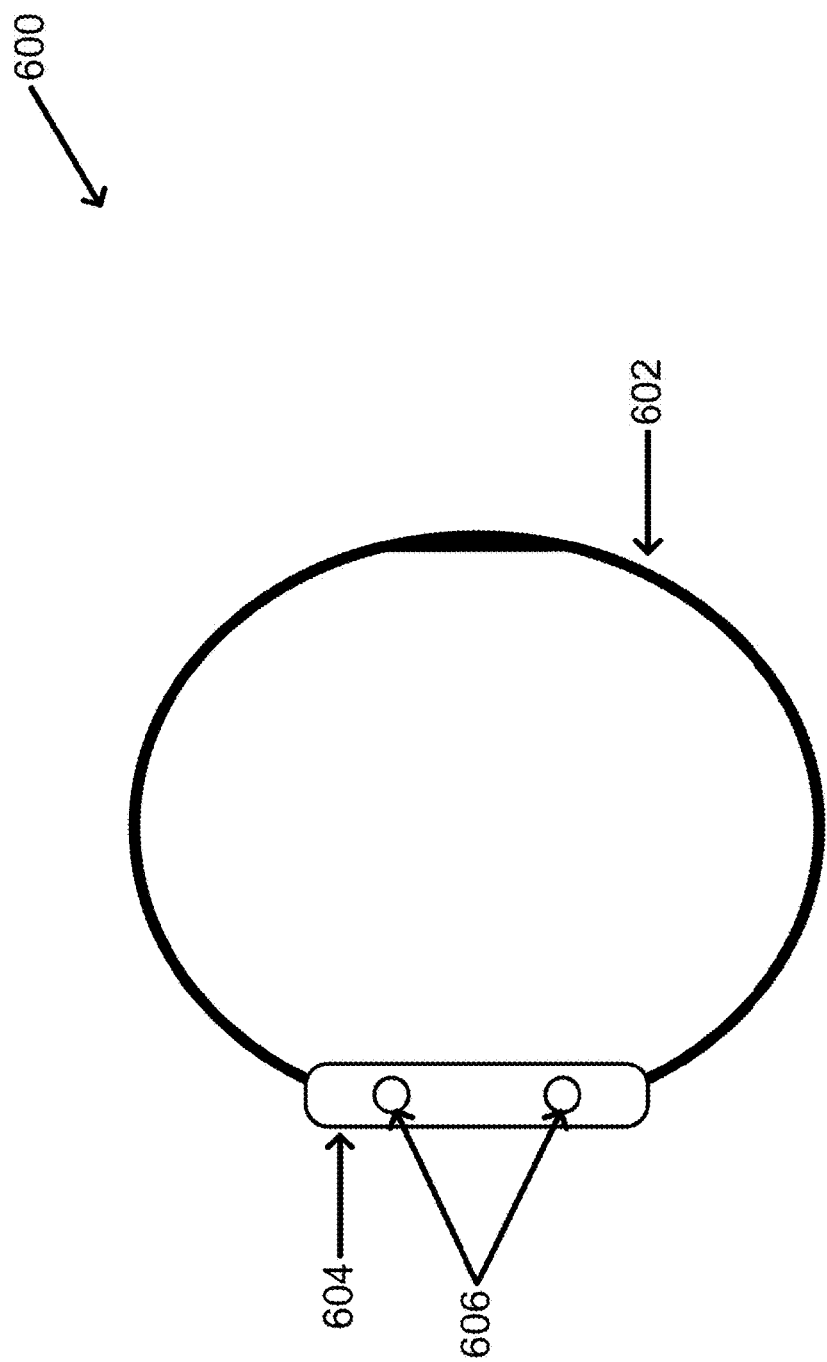
FIG. 6 illustrates an example watch with cameras on the side for computer vision.

FIG. 6 illustrates an example watch with cameras on the side for computer vision, arranged in accordance with at least some embodiments described herein.

One or more cameras 606 can also be integrated to the side of the watch 604 with wristband 602, as shown in diagram 600. The cameras 606 can be used to recognize gestures or to calibrate the position of the wristband 602.

Figure 7:
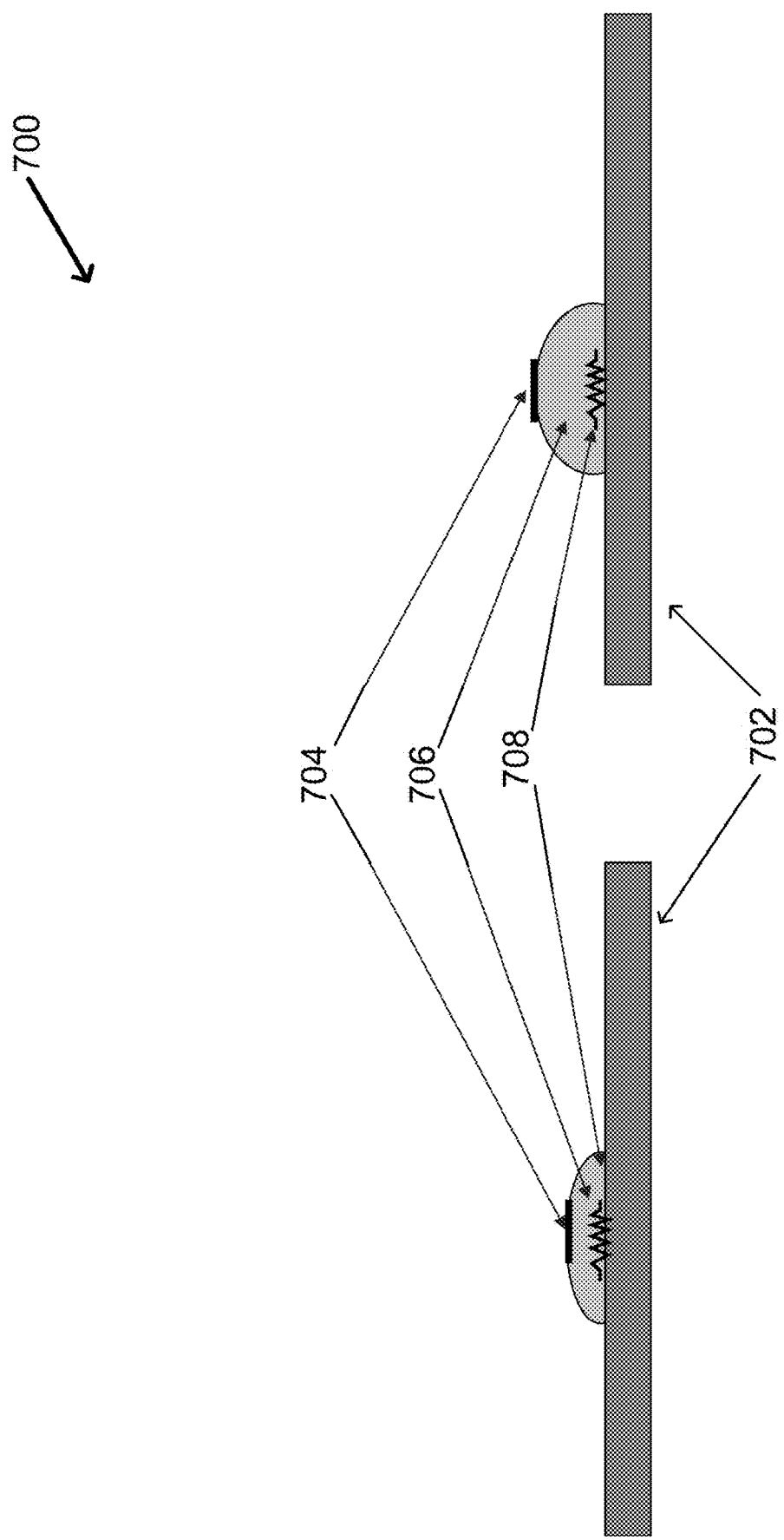
FIG. 7 illustrates another example design for improved electrode contact.

FIG. 7 illustrates another example design for improved electrode contact, arranged in accordance with at least some embodiments described herein.

The wristband can be designed to ensure good contact between the sensors and the skin. But if the band is worn too tight, the user may feel discomfort. One solution to this problem is to place the electrodes on inflatable structures, e.g. bubbles, which inflate only when the electrodes are in use. The bubbles are not inflated when the sensors are not in use. The bubbles may be connected to micropumps which can pump air or another fluid into the chamber, from a reservoir, to inflate the bubbles when desired. Diagram 700 illustrates another method for inflating a bubble 706 by heating the fluid in the bubble 706 with a heater 708. The bubble 706 on an inside surface of a wristband 702 maybe filled with a fluid that have a high thermal expansion coefficient, such as oil. Upon instruction from the user, or from a predetermined signal such as an incoming notification or a past behavior of the user, the heater 708 may be enabled and the bubble inflates to increase the contact between the electrode 704 and the skin.

Alternatively, mechanisms, e.g. motors controlling a screw, maybe implemented on the bands to tighten the band around the wrist when the system is to be used. Monitors, such as sensors measuring the stress in the band or measuring the contact impedances, can be used to give feedback to the adjust the tightness of the band around the wrist. One method to adjust the tightness of the band or the inflation of the bubbles may be to use an invocation command. For example, the user may use a double finger tap, an event that can be detected by an accelerometer mounted on the watch or in the wristband and which does not need close contact with the skin to detect the tap, to initiate the tightening of the wristband by inflating bubbles in the wristband. The finger tapping may also be detected with the camera on the wristband, or another camera that is part of the AR system. When the user dismisses the system, e.g. by another double finger tap, the wristband/electrodes are deflated.

Alternatively, the system may, through machine learning, recognize a gesture of the user and inflate or tighten the band without being explicitly commanded by the user. For example, using the IMU on the watch, the system may sense that the user is lifting his finger and is making a pointing gesture, using machine learning trained using past data. The band is then tightened, and sensors are enabled. The system can also be programmed to respond when prompted by incoming events, such as a notification for an incoming message or email. In this case the system can increase the tightness of the band (e.g., by pumping to inflate the bubble) to the wrist in order for the user to be able to use the most effective sensors to respond. The tightening of the wristband may also serve as a notification to the user that an event has occurred, and is waiting for a response, without visual or auditory notification. Alternatively, a shape changing memory alloy such as Nitinol, which will bend upon heating, for example by passing a current through, can be used increase the contact of the electrode with the skin, e.g., by tightening of the wristband. Micromotors or shaping changing materials may be placed in the buckles of the strap or band and enabled to change the tightness of the band.

Figure 8:
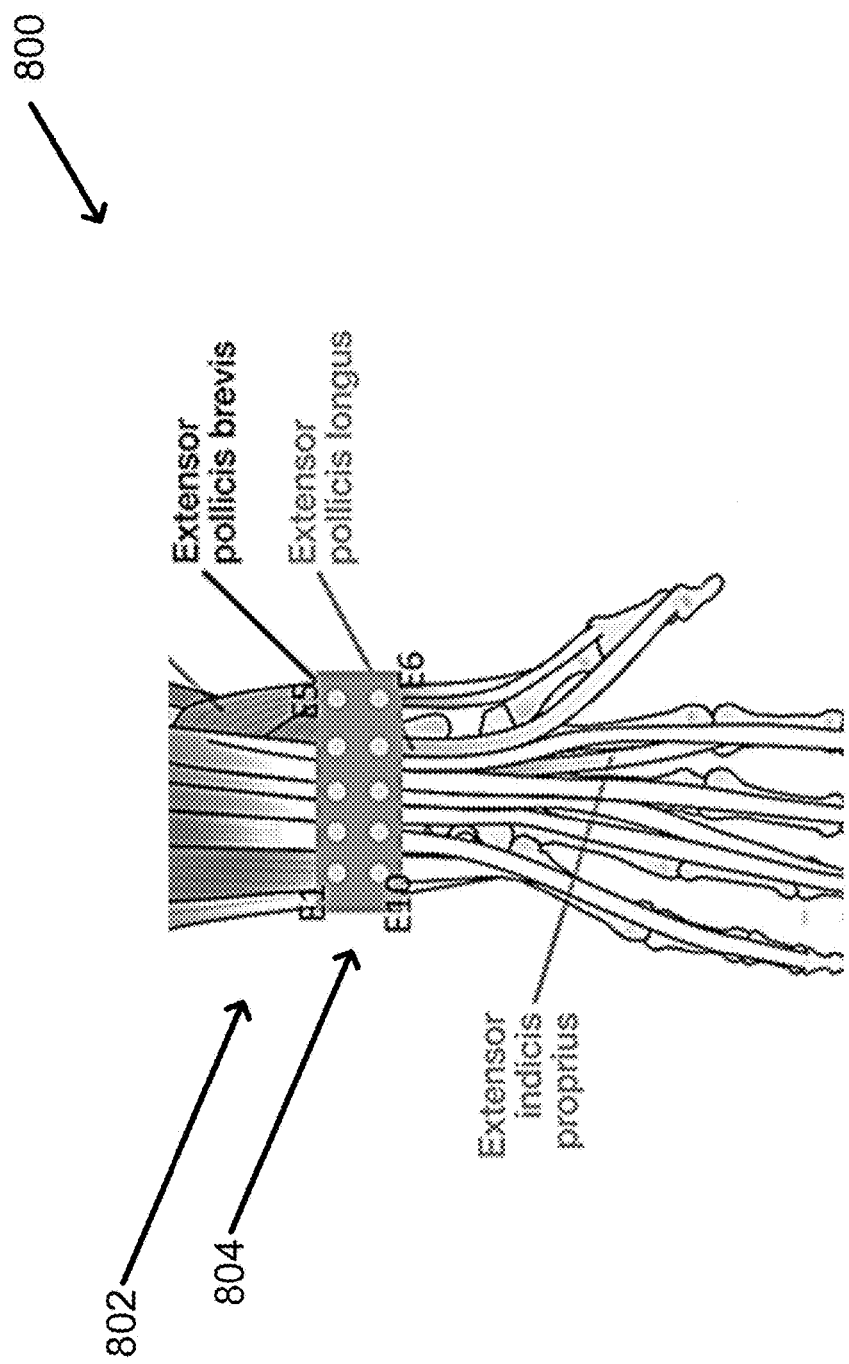
FIG. 8 illustrates an example system for calibration.

FIG. 8 illustrates an example system for calibration, arranged in accordance with at least some embodiments described herein.

In practical uses, the wristband position may shift while being worn, and especially between donning and doffing of the wristband. Each time the band is taken off and put on again, position of the electrodes relative to the user's muscle groups may vary. Different users may also have different wrist sizes or anatomy. Thus, a wristband calibrated on one user may not work well for another. These factors may cause differences in the bio-signals received by the sensors. The following methods, either one method or in combination, may be used to the calibrate the band position and increase the accuracy of the wrist 802 worn sensors. The calibration process may start with a user-initiated gesture. Using the example of an EMG wristband 804 shown in diagram 800 as an example, the user may use a double finger tap (e.g., with index finger and thumb) to initiate the calibration process. The double finger tap may be detected with an accelerometer that is embedded in the wristband 804. During the finger tapping event, the EMG signals, detected with multiple EMG sensors, are associated with the index and thumb movement. The data are then used to obtain spatial filters which may apply different weight to the sensors in the sensor array E1-E10.

Alternatively, to save power, the EMG sensors may be turned off when not used. At the detection of the first tap, the process may start with the recording of the wristband EMG sensors. The EMG signals corresponding to the second finger tap can be used for calibration, e.g., generating the spatial filters. In the example of diagram 800, the EMG sensors may be arranged in an array E1-E10. The finger tap typically involves the extensor muscles of the thumb and the index finger. The detection of the EMG signal from different EMG sensors associated with the finger tap may be used to assign the EMG sensors to the different muscle groups. An exemplary implementation may be the use of a spatial filter that applies different weight to the sensor array, which are calibrated in real time from the double finger tap action. Interpolation, and extrapolation methods, machine learning methods may be used in combination to detect the rotation of the sensors and with the assignment of the sensors.

In diagram 800, the wristband 804 may have 10 EMG electrodes, labeled E1 to E10, and other sensors such as accelerometers. The band may move around the wrist. Upon the initiation of the EMG functionality, for example with a double finger tapping, the EMG signal measured during the finger tapping can be used to dynamically associate the electrodes to the function of different muscles. The electrodes, E4, E5, E6, E7 are more affected by the thumb movement. Other electrodes such as reference and ground electrodes are not shown. In another embodiment, accelerometers/IMUs may be used, optionally with machine learning, to detect when the user is about to use the system. This can be achieved by labeling the actions to generate training data. The pattern of the accelerometer/IMU signals are then matched to the actions and provided for training to a machine learning model. Other sensors or combinations of different sensors maybe calibrated in similar way, for example, an array of optical, including NIR, sensors, or an array of accelerometers, or mechanomyography sensors.

Computer vision techniques can be used to detect finger movement and to assist in the calibration of the sensor positions, which can be done continuously. Cameras may be mounted on AR glasses or mounted on the wristband, e.g. the cameras on the watch shown in FIG. 6. Whenever the hands are in the view of a camera, e.g. those on AR glasses, the pose of the hand and the finger movement are collected and are used to label the sensor data for calibration of the sensors. As an example, the camera may recognize that the user extended the index fingers. The signals collected from the wrist-worn sensors at the same time may then be used to obtained calibration parameters for these sensors, e.g. by training the machine learning model using the labeled sensor data. The calibration process may be undertaken during the time of putting on the wristband. The computer vision and the EMG (or other sensors) signals are collected simultaneously, with the computer vision detected finger/hand gestures used as the input for calibration of the EMG sensors position. For example, the EMG signals, detected with multiple EMG sensors, are associated with the different finger movement detected by the computer vision. The data and the correlation to the finger movement are then used to obtain a spatial filter discussed above.

Alternatively, or in addition to the above, bioimaging techniques such as ultrasound, electrical impedance tomography, radar or diffuse optical tomography can be used to calibrate the wristband to the anatomical structures of the wrist, for example the bones. The imaging data can be used to generate the spatial filters. Machine learning based pattern recognition technique, including neural networks such as convolutional neural network (CNN), can be used to train and obtain the spatial filter. Using a high density of electrodes, one can use the CNN to recognize patterns associated with each type of gestures. As an example, an array of sensors, for example EMG or NIR sensor, can be arranged on the skin and collect the biosignals as a function of time, using a given sampling frequency. The signal can be displayed as a series of frames, each frame collected as a sampling time and arranged spatially by the sensor array. Image recognition technique can then be used to associate the frame to a hand pose/gesture. For example, the frames are then used to train a neural network to recognize gestures, using the labels provided by vision methods using camera.

Figure 9:
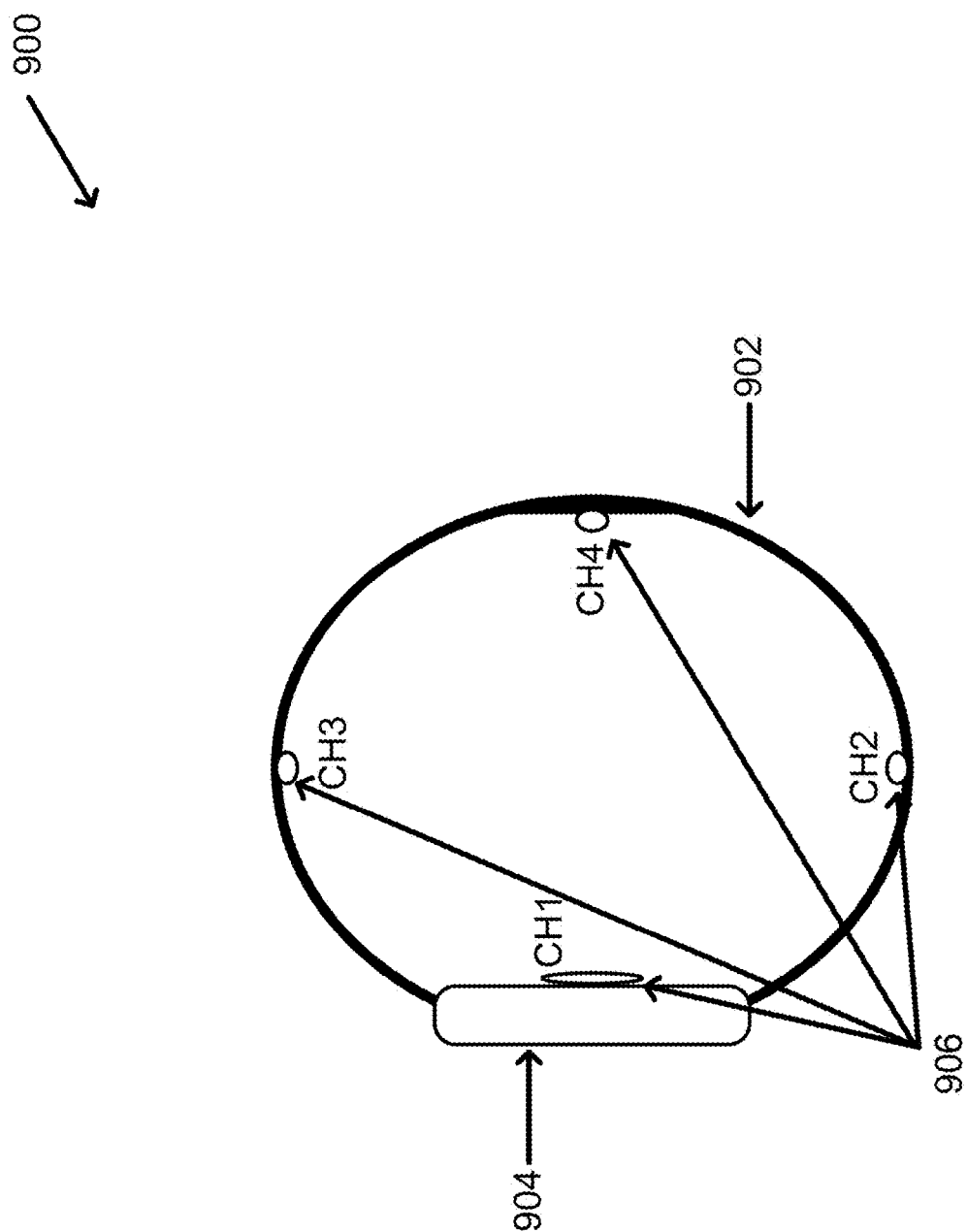
FIG. 9 illustrates an example placement of optodes on an inside surface of a watch band.

FIG. 9 illustrates an example placement of optodes on an inside surface of a watch band, arranged in accordance with at least some embodiments described herein.

In the following paragraphs, methods for performing functions of computer mouse, including point and click, drag and drop, and pan and zoom, using wrist worn sensors are described. The sensors described in the previous sections are implemented in groups on a wristband to sense the finger and wrist movement, which in turn controls the position of the pointer/cursor. Another finger gesture such as an index figure tap, or a thumb extension, is sensed as the click event.

In one exemplary implementation, the user uses thumb motion to move a cursor on a display. For example, the user may use the extension/flexion motion of the thumb for moving the pointer in one (e.g. horizontal) direction while using the abduction/adduction motion of the thumb to move the pointer in the second (e.g. vertical) direction. These motion gestures can be senses by the CH2 and CH3 electrodes (sensing the EMG signals) or optodes (sensing the blood vessels using near infrared sensors) shown in FIG. 2A. Alternatively, IMUs can be used to track user's hand and wrist movement and use these signals to control the positions of the cursor.

In another exemplary implementation, the user uses the extension/flexion (or the abduction/adduction) motion of the thumb for moving the pointer in the one (e.g. horizontal) direction while using the deviation (adduction and abduction) motion of the wrist to move the pointer in the second (e.g. vertical) direction.

These motions maybe sensed by groups of sensors, e.g. the EMG CH2/CH3, and CH4 electrodes, or by capacitive sensors, or by optical optodes, or a combination of two or more types of sensors.

In another exemplary implementation, the user uses one gesture, e.g. clenching of the fist, to move the cursor in the one (e.g. horizontal to the right) direction while using another gesture, e.g., flexion of thumb, to move the pointer in the opposite (e.g. horizontal to the left) direction. These motions maybe sensed by EMG electrode, by optical/NIR sensors (optodes), or a combination of these sensors. Another set of gestures and sensors may be used to move the cursor in the second direction (e.g. vertical).

FIG. 3 shows the muscles involved and the principle of detection using the example of EMG. CH1 EMG detects the extensor of index fingers. CH2/CH3 monitors the abduction or extension of the thumb. CH4 can be used to measure the firing of Flexor carpi ulnaris and Flexor carpi radialis muscles which control the wrist sway (deviation) from side to side.

The magnitude of the cursor movement may be associated with the magnitude and/or frequency of the sensor signals. Alternatively, or in combination with the frequency/magnitude of the sensor signals, the sensor signal may be fed to a machine learning model. The confidence levels of the predicted thumb movement, e.g., adduction/abduction and extension/flexion, are used to predict the position of the cursor on the screen.

Using the sensor placement in FIG. 3 as an example, CH2 may be more responsive to the extensor movement of the thumb and wrist while CH3 may respond more to the abduction/adduction, and flexor movement of the thumb. The (x,y) position of the cursor may be calculated with the following formula, Eq. 1:

$$x = \alpha_{11} f(CH2) + \alpha_{12} f(CH3) + x0$$

$$y = \alpha_{21} f(CH2) + \alpha_{22} f(CH3) + y0$$

where f(CH) is a processed sensor signal (e.g., magnitude, frequency, or envelop) associated with the sensor at channel CH. Parameters, $\alpha_{11} \ldots \alpha_{22}$, can be learned using machine learning. Quantities x0 and y0 are offsetting parameters that may be set to center the cursors and are also depending upon the initial position of the hand/wrist. Alternatively, the position of the cursor may be associated with the prediction confidence level from a gesture recognition machine learning model, as shown in Eq. 2:

$$x=\beta_{11}P(\text{Thumb})+\beta_{12}P(\text{Wrist})+x0$$

$$y=\beta_{21}P(\text{Thumb})+\beta_{22}P(\text{Wrist})+y0$$

In Eq. 2, P(Thumb) and P(Wrist) are the probability of detecting a thumb (wrist) movement predicted by a machine learning model using the sensor signals from all sensors. The α and β parameters may be trained using labeled finger movement/sensor signal. They can also be updated/calibrated dynamically during use, based on user input. Visual feedback on a computer display may be provided to users during training and during actual the use so that they may adapt or learn to control the cursor with their own finger movement.

In another embodiment, two machine learning models may be used at the same time. One model is trained principally to track the thumb movement. The second model is trained to track the index finger movement. Each model relies on input from a group of sensors. The configurations of the sensors in each group, including the types of sensors (e.g. EMG or optical or accelerometer or capacitive, and so on), may be dynamically configured to adapted to the use condition and signal quality from each sensor. Prediction probabilities from these models maybe used to calculate the cursor coordinate, similar to Eq. 2.

In another embodiment, the user may use the thumb movement to emulate a right mouse click while the index finger tap as a left mouse click. One preferred embodiment is to use multiple sensors, each accomplishing a different task, to accomplish the desired actions. For example, for pointing in three-dimension typical of an augmented reality application, multiple sensor types may be used, each sensing different types of wrist/finger movement, to control the cursor movement in a given direction. For example, sensors in Group A may sense wrist movement Type A and movement Type B, to move the cursor in the first and second directions. While sensors in Group B may sense a different wrist/finger movement and move the cursor in the third direction. Yet another, sensors in Group C, may be used to detect the click action. The combination of these functionality can achieve the functionalities of a computer mouse, such as point and click, drag and drop, and pan and zoom, in three dimensions.

In one example, sensors in Group A may be an accelerometer or inertial measuring unit (IMU) and wrist movement Type A may be a wrist rotation, and wrist movement Type B may be a wrist move up or down. Sensors in Group B may be an optical sensor (including the light source and detector) and the wrist movement may be a wrist deviation movement, i.e., wrist adduction and abduction. sensors in Group C may be an EMG sensor that sensor a finger movement, e.g., an index finger extension or a thumb extension.

In another example, alone or in conjunction with the EMG sensors, optodes can be used to monitor the finger/hand/wrist movement and its signals used to control the pointer position. The click action may be performed by a tap on a surface and detected by accelerometer built-in the watch or the wristband. An illustrated in diagram 900 of FIG. 9, optodes 906 may be placed in the locations on the wristband 902 and watch 904 labeled CH1, CH2, and optionally CH3 and CH4. It is expected that CH1 may be more sensitive to the bending of the wrist while CH2 may be more sensitive to the deviation movement (wrist adduction and abduction) of the wrist. Thus, these signals can be used to control a cursor's movement with wrist movement.

Signal form CH1 and CH2 may be used to drive the x, y positions of the cursor, e.g., using Eq. 3:

$$x=\alpha_{11}f(CH1)+\alpha_{12}f(CH2)+x0$$

$$y=\alpha_{11}f(CH1)+\alpha_{12}f(CH2)+y0$$

In Eq. 3, the function $f$ may represent the amplitudes of the detected (and/or preprocessed) signal from the sensors, in this example, the optodes. Function $f$ may also be derived quantities, such as output of a machine learning model, that are dependent on the raw and preprocessed signals of the optodes. Ch3 and CH4 are optional and may be used to add redundancy and increase the reliability of the received signal, e.g., to correct for the tightness of the wristband during use.

Figure 10:
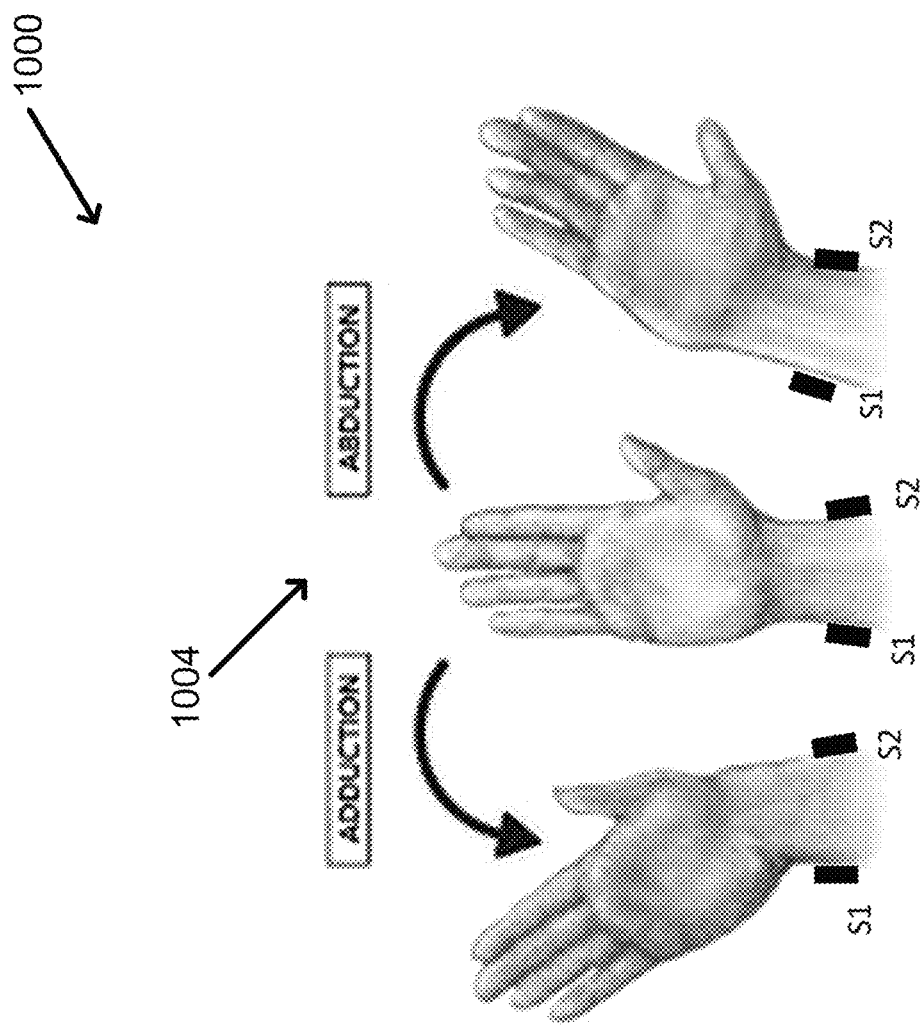
FIG. 10 illustrates measurement of abduction and adduction of wrist by sensors.
Figure 10:
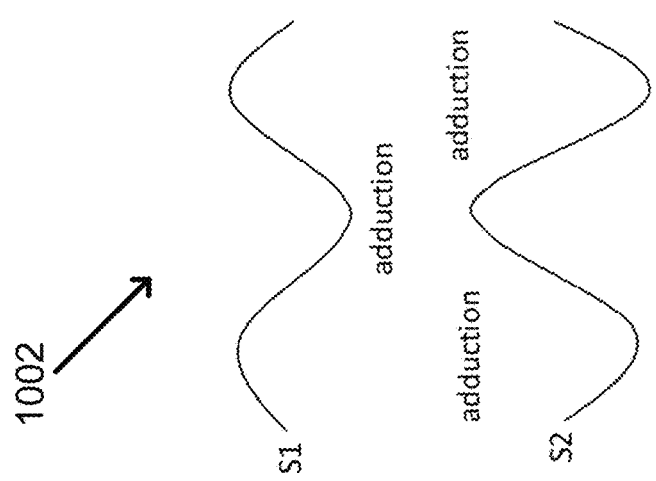

FIG. 10 illustrates measurement of abduction and adduction of wrist by sensors, arranged in accordance with at least some embodiments described herein.

Diagram 1000 provides an illustration 1004, where sensors are placed on one or both side (e.g. the ulnar and radial side) of the wrist (corresponding to CH1 and CH3 in FIG. 9). The sensors may be EMG, force, displacement, capacitive, and optical sensors or a combination of. For example, sensor S1 (and S2) may an optode, comprising of a light emitting diode emitting light in the optical or infrared region of the spectrum and a photodetector detecting the reflected light off the wrist. The received signal of the sensors may be a function of the adduction or abduction movement of the wrist, as shown in illustration 1002 of diagram 1000. The sensors may be part of a wristband. The sensor signal may be used to drive a cursor on a computer screen along one direction, for example, along the horizontal direction. The position of the cursor then follows the wrist movement of the user. Signal from one of the sensors may be used for the above purpose. Alternatively, the combination of signals from sensors S1 and S2 can be used, e.g., the difference of the signal, can be used to increase the sensitivity and reduce the noise. Combination of different type of sensors, for example, optode with EMG, optode with capacitive sensors, optode with displacement sensors, can be used to increase the reliability of this method to overcome the anatomical differences between the uses, for example users with different skin types, different body weight, and different habit of wearing the wristband (tight vs loose).

Another group of sensors may be placed on the front and back side of the wrist to monitor the flexion and extension of the wrist. The signals from these sensors can then be used to drive a cursor a long a different direction from those sensors mounted on the side of the wrist, for example, along the vertical direction.

In one embodiment, EMG signal maybe combined with accelerometer, magnetometer and gyroscope (the IMU) sensors to control a cursor. The fusion of the EMG and IMU sensor data are fed to machine learning models to train the system to track the user's hand movement and finger gestures.

In another embodiment, twist of the wrist may be detected by the accelerometers mounted inside a watch or wristband and used to drive one directional movement of the cursor. At the same time, the lifting or lowering of the arm may be used to drive the second directional movement of the cursor. While an index finger gesture, e.g. flexion or extension, may be detected by the EMG sensor to cause a click operation.

In another embodiment, twist (rotation) of the wrist may be detected by the accelerometers mounted inside a watch or wristband and drive one directional movement of the cursor. At the same time, clenching of fist, as detected by EMG or optical sensors worn on the wrist, may be used to drive the second directional movement of the cursor.

In yet another embodiment, twist (rotation) of the wrist may be detected by the accelerometers mounted inside a watch or wristband and drive one directional movement of the cursor. At the same time, the movement of the thumb, as detected by EMG or optical sensors worn on the wrist, may be used to drive the second directional movement of the cursor. As an example, the x and y coordinates of the cursor on a computer screen may have the following relationships as shown in Eq. 4:

$$x=\beta_{11}P(\text{Thumb})+\beta_{12}A(\text{Wrist})+x0$$

$$y=\beta_{21}P(\text{Thumb})+\beta_{22}A(\text{Wrist})+y0$$

In Eq. 4, P(Thumb) indicates the signal amplitude, or predication probability from a machine learning model, of the thumb movement as detected by EMG sensors or optical/NIR sensors. And A(wrist) indicates the amplitude of the accelerometer channels. The beta coefficients are for proper normalization and x0, y0 are for the proper centering of the cursor. Smoothing such as weighted moving average or filtering, and interpolation of the coordinates to reduce the uttering of the cursor movement may be used.

In a further embodiment, two wristbands, each worn on one wrist, may be used. The movement of one thumb, as detected by EMG or optical sensors worn on the wrist, may be used to drive the one directional movement of the cursor. The movement of the second thumb, as detected by EMG or optical sensors worn on the second wrist, may be used to drive the second directional movement of the cursor.

Alternatively, as described previously, an arm/wrist rotation, measured with an accelerometer or gyroscope may be used to drive the cursor along the second direction. The "mouse" click may be initiated with an index finger tap, or a thumb extension, that is detected by one or more of the sensors mounted on the wristband including accelerometer, EMG and optical sensors.

An exemplary embodiment may use a combination of the sensors for the mouse function. For example, optodes in FIG. 9 and FIG. 10, may be used to detect the wrist deviation movement and drive the cursor on the horizontal direction. At the same time, the rotation of the wrist sensed by an accelerometer may drive the cursor in the second direction. An extension of the index finger, which are monitored by one or more EMG electrode, performs the click action.

With slight modifications from preceding methods, mouse click-down and click-up down functionality can be implemented. One method of accomplishing these tasks may be to use of a combination of different types of sensors. For example, accelerometer can be used to detect a finger pinch/tap, e.g., between the index finger and the thumb, which is then used to initiate a mouse click-down action. The click-up, or release, action is initiated with the un-pinching of the fingers and detected by EMG and/or optical sensors.

With the detection of the click-down and click-up actions, the drag and drop, pan and zoom functions of a mouse can be implemented. For example, with the pointing function described above, the user can move the cursor to a first point, then perform a click-down action, which may cause a two-dimensional selection square to appear. The user can then drag the cursor and expand the selection square. The selection is performed with the click-up/release action. With the selection, zoom or pan actions can be implemented by clicking on zoom or pan buttons.

The user can use combined sensors for three-dimensional cursor movement and selection. For example, The user may move the cursor in the first direction/dimension by rotation of wrist (detected by one group of sensors, e.g. accelerometer), in the second direction/dimension deviation (e.g. abduction and adduction) of wrist (detected by a second group of sensors, e.g., EMG and/or optical sensors), and in the third direction/dimension by lifting of the arm (detected by a third group of sensors, e.g. accelerometers). An exemplary selection process in three-dimension may be as follows:

1) Triple tapping of fingers to initiate the 3-D selection function. The double tapping, in this case, is reserved for 2-D selection.
2) Move the cursor with wrist as described above. Pinch fingers, e.g. index finger and the thumb, may be used to select the first point to drag.
3) A selection cube appears in a 3-d display, e.g. in the augmented reality glasses. The user can drag cursor indicating the opposing corner of the cube to a point of interest, using sideways movement of wrist (deviation, abduction/adduction) to move cursor along one direction (e.g. horizontal), using the rotation of the wrist to move the cursor in the second dimension (e.g. up/down direction), and using arm up/down motion to move the cursor in the third direction (further out in distance).
4) Un-pinch the fingers to make the 3D selection.

In the above example, the third dimension may be controlled with thumb movement, sensed by one or more EMG sensors. For example, extension of the thumb extends the cube in the third dimension.

In another embodiment, methods are provided for manipulating three-dimensional objects in a multi-sensor wristband. Different sensors and sensor types are used to recognize different hand gestures for manipulate 3D object. For example, using accelerometers to detect the wrist rotation and deviation movements described previously, the user can move the cursor and select a 3-D object. With thumb extension, detected by EMG sensors or by optical/infrared sensors, the user can scale up the 3-D object for closer inspection. The scaling is controlled by the degree of the thumb expansion, as measured by the EMG sensor amplitude and/or frequency. With 3D object selected, rotation of the wrist may cause the 3-D object to rotate.

The preceding actions can be accomplished with a single wristband and single hand actions. With the wristbands worn on both wrists, the user can use wrist movement of one hand to move the cursor, the finger movement for selecting an object, and use the wrist movement of the second hand to rotate, zoom or pan the object. The wristband on the second hand may be activated with a double finger tap/pinch that is detected with an accelerometer.

Figure 11B:
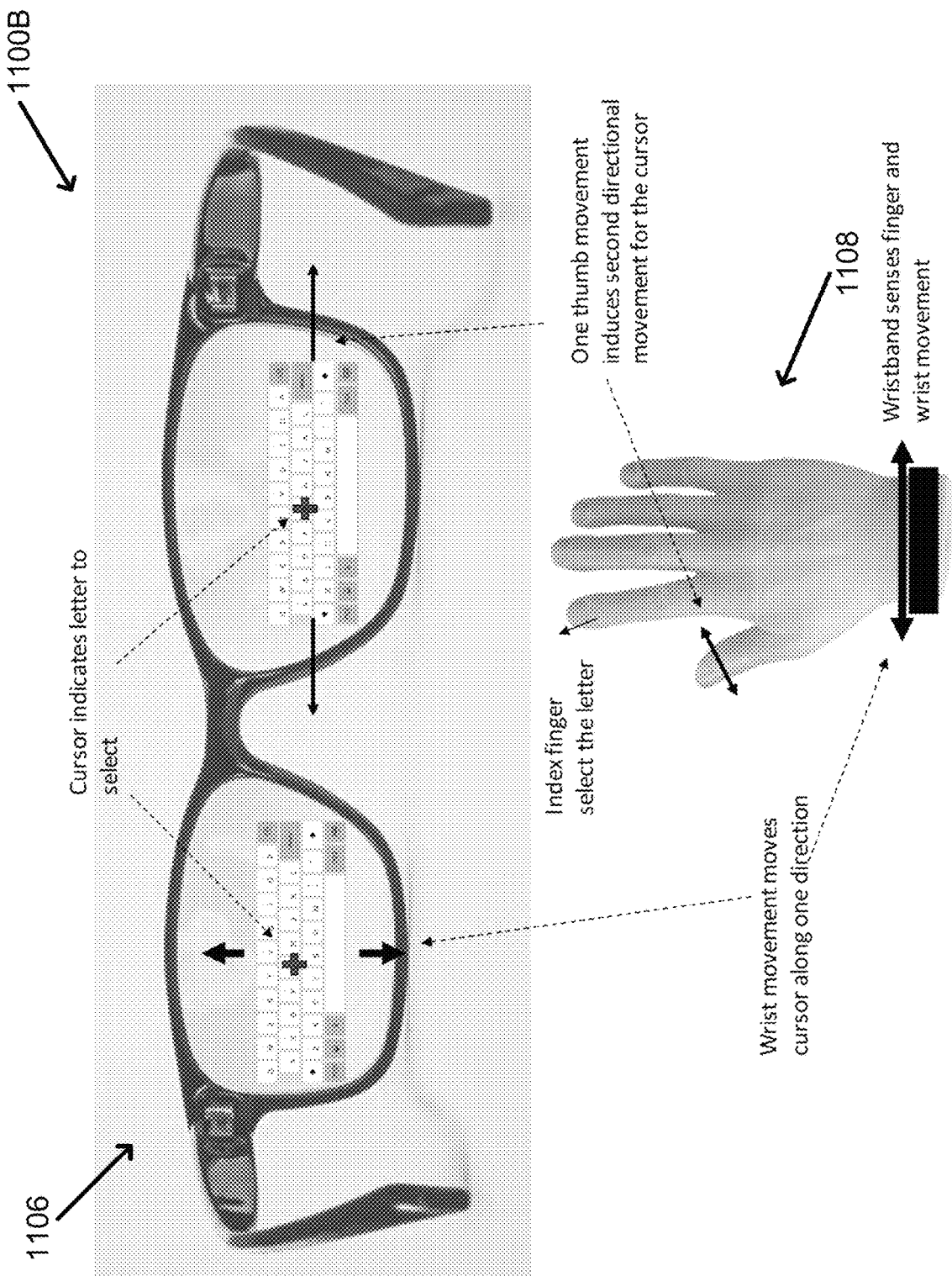
Figure 11C:
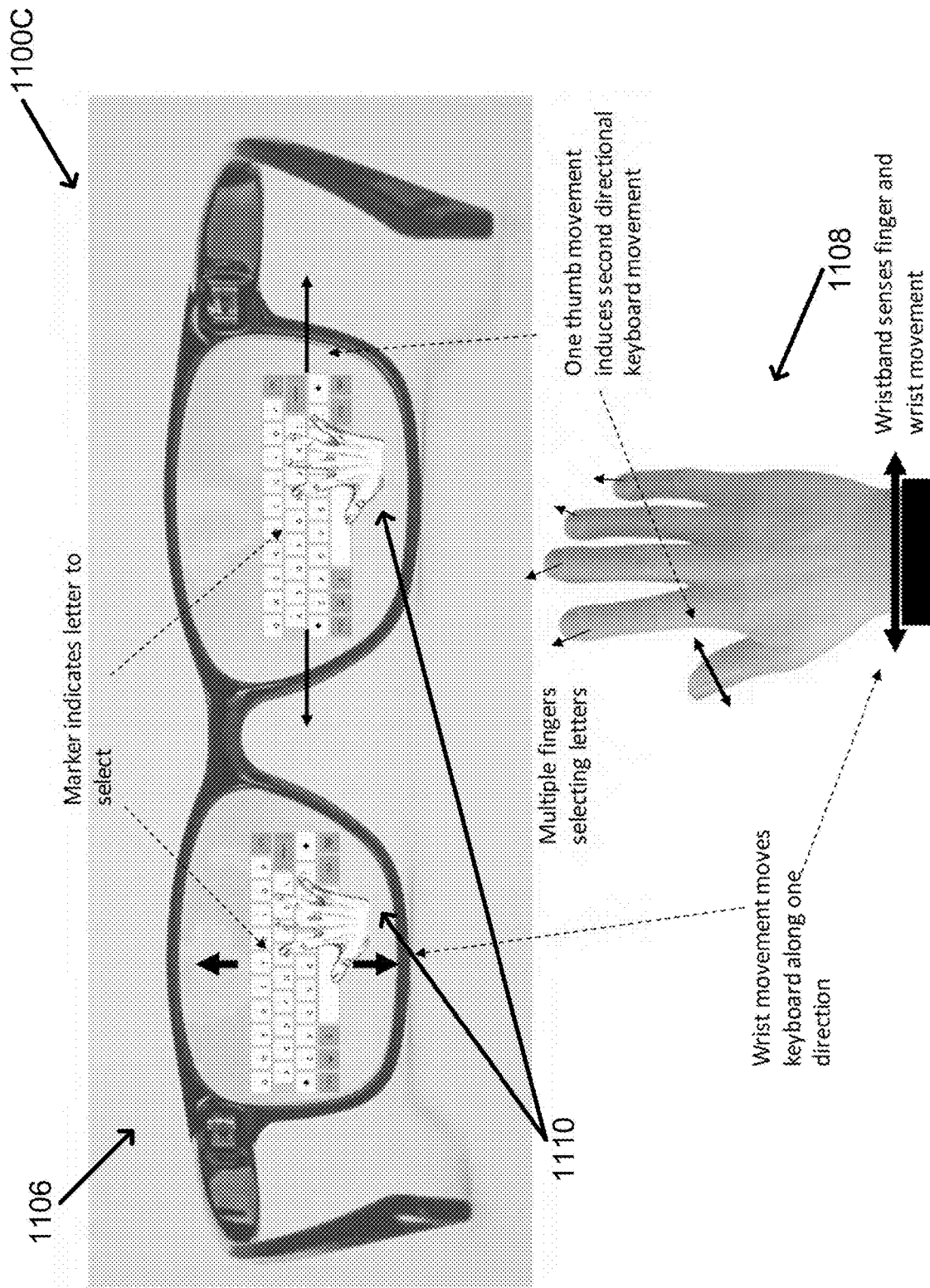

FIGS. 11A, 11B, and 11C illustrate examples of a system visually presenting a keyboard and using finger and wrist movements for text entry (typing) through the keyboard, arranged in accordance with at least some embodiments described herein.

In the following sections, typing/text entry methods using wrist worn sensors detect finger and/or wrist movement are disclosed in conjunction with diagrams 1100A, 1100B, 1100C. The user uses the finger and wrist movement to move a cursor on a virtual keyboard on a display screen. The user selects the letter by a finger tap when the desired letter come across to a fixed cursor on the screen. Autocomplete techniques and computer vision techniques may assist in the determination of user intent and increase the typing speed. Several methods of using two hand or one hand to accomplish the text entry task using, in part, the sensor mounting and wrist/hand gesture detection methods described in the previous sections.

Two Handed Typing

The method illustrated in diagram 1100A is for the case of typing with two hands without using a physical keyboard, where the display is a pair of augmented reality glasses 1102. Alternatively, the display can be a single screen, for example a smart TV screen. Sensors, sensors placement, and sensor grouping and machine learning methods disclosed in the previous sections can be used to sense the hand gestures 1104. In one embodiment, the sensors are embedded on the back face of a watch and in the wristband for sensing EMG, MMG, or optical/NIR signals for detecting finger movement. Time or amplitude of the finger movement can be used to cause the moving of the cursor over a virtual keyboard and the typing selection. In another embodiment, IMUs are used to track the user's wrist and hand movement and control the position of the cursor.

In another embodiment, the thumbs control two directional movement of a keyboard on the screen and select a letter when the letter of interest crosses or near a fixed cursor on the screen. Each thumb control one directional movement. Selected letter is highlighted, the displayed font is enlarged, much like typing on a cell phone.

In another embodiment, the abduction/adduction movement of each wrist are sensed by sensors, such as optodes, EMG, and force, capacitive, and displacement sensors or their combination, e.g., FIGS. 9 and 10, and drive one directional movement of a cursor on a virtual keyboard. A finger tap, e.g., the flexion or extension of the index finger, selects a letter from a virtual keyboard.

In one embodiment, twist (rotation) of the wrist may be detected by accelerometers mounted inside a watch or wristband and used to drive one directional movement of the keyboard. The second hand may drive the second directional movement of the keyboard. Upon the selection of the letter, the click is performed with an index finger tapping, as detected by an EMG or optode sensors mounted on the wristband.

In another embodiment, twist of the wrist may be detected to the accelerometers mounted inside a watch or wristband and used to drive one directional movement of a cursor. The second hand may drive the second directional movement of the cursor. The cursor moves across a virtual keyboard to a letter of interest, the click is performed with an index finger tapping, or a thumb extension, as detected by an EMG or optical sensors mounted on the wristband, to select the letter for typing/text entry.

In another embodiment, two cursors, each controlled by one hand may be used for selecting the letter more quickly. Each cursor may be placed to move around in one half of a virtual keyboard. The cursors are controlled by the combined thumb movement and arm twist. The cursors may be in the form of a hand to emulate more closely the typing actions.

Machine learning techniques are used to train with known gestures and also to infer the finger movement during typing. Optionally, cameras installed on the AR glasses can be used to assist in the determination of the user's finger movement and to calibrate the band position. For example, methods similar to Eq. 1 and Eq. 2 may be used to generate the position of the keyboard on the display.

One Handed Typing

One method to perform single hand typing is shown in diagram 1100B. In this method, the thumb and wrist movement of one hand 1108 controls the position of the cursor on the screen (AR glasses 1106).

Alternatively, two fingers can control the movement of the keyboard and third finger does the typing. In one embodiment, the user may use thumb to move a cursor in one direction, the index finger to move the cursor in the second direction over a virtual keyboard. Then the user can use the middle finger, e.g. tapping middle finger, for selecting the letter when the cursor overlaps the letter on the keyboard.

Alternatively, the user can move the keyboard and fixed the cursor position. For example, the user may use thumb to move the keyboard in one direction, the index finger to move the keyboard in the second direction. Then, the user can use the middle finger, e.g. tapping middle finger, for selecting the letter when it comes close to the cursor.

Another method of using two fingers for typing is to use thumb movement to control the motion of the cursor while using index finger to type. For example, the thumb extension/flexion to control cursor in one direction while using thumb abduction/adduction movement for the second direction, over a virtual keyboard. Motions are sense in real time by EMG or MMG or NIR sensors mounted in wristband, with machine learning algorithms.

In yet another embodiment, the wrist or hand movement or a forearm rotation can be measured using the accelerometer or IMU sensors on the wristband to cause the cursor to move within the view of the user. The user moves the cursor over a virtual keyboard to the key of the letter to be typed. The user then flexion or extend the index finger or the thumb to type the letter.

In one embodiment, twist of the arm may be detected by one or more accelerometers mounted inside a watch or wristband and used to drive one directional movement of the keyboard. At the same time, the lifting or lowering of the arm may be used to drive the second directional movement of the cursor across a virtual keyboard for selecting a letter to type.

In another embodiment, twist of the arm may be detected by one or more accelerometers mounted inside a watch or wristband and used to drive one directional movement of a cursor. At the same time, the lifting or lowering of the arm may be used to drive the second directional movement of the cursor across a virtual keyboard for selecting a letter to type.

Figure 12:
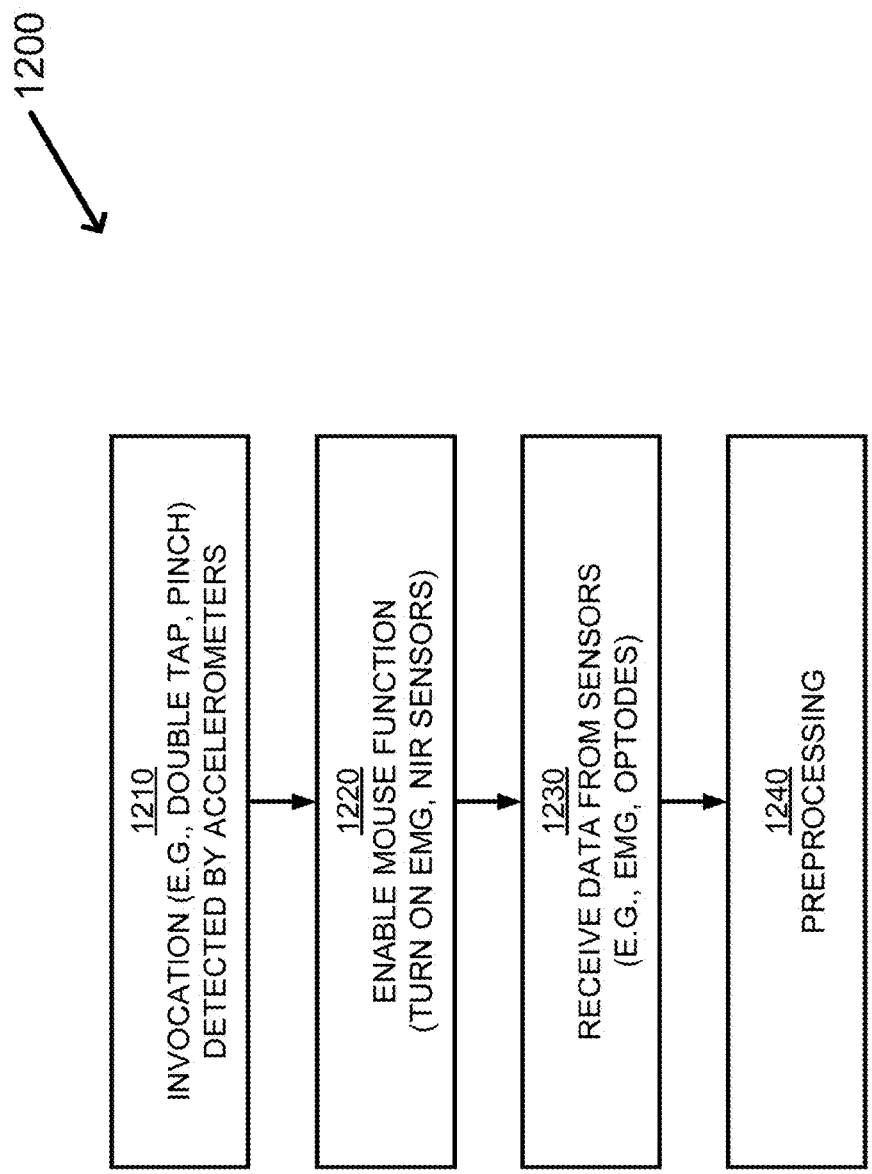
FIG. 12 is a flowchart of an example process of operating computing devices through sensors on or near a hand, all arranged according to at least some embodiments presented herein.

In another embodiment, sensors such as optodes, EMG, capacitive, force, or displacement sensors and their combinations, may be installed on the ulna/radial and the front and back sides of the wrist to detect the user's wrist movement. For example, as illustrated in FIG. 12, the adduction/abduction of the wrist can be detected to drive the cursor to move in one (e.g. horizontal direction) and flexion/extension of the wrist may be used to drive the cursor in the second direction over a virtual keyboard to select a letter to type. A flexion or extension of the index finger, detected by an accelerometer, EMG or optodes, performs the actual selection.

In another embodiment, the second directional movement of the cursor is driven by the rotation of the forearm/wrist and detected by an accelerometer.

In some embodiments, the cursor can also use a virtual hand 1110 as shown in diagram 1100C. Multiple fingers can be enabled (sensed with wristband) to increase typing speed, also as illustrated in diagram 1100C.

The keyboard may also be controlled to move with head movement, which can be detected with IMU sensors in glasses or other head mounted displays. Or eye tracking techniques may be used to move the keyboard with the move of the eyes.

Combination of these above techniques can also be used to increase the accuracy of the overall gesture detection and typing accuracy. In particular, when the hand is in the view of a camera, computer vision techniques may be used to assist and calibrate the performance of the wrist worn sensors.

Autocomplete techniques can be used to assist in the typing, for example to present the possible next letter or the possible words. The suggestion can be based on the context of what the user has already typed, the dictionary, language model. Also autocorrect, suggested letters or words may be displayed and selected with a tapping of the figure.

Exemplary Process Flows For Mouse And Text Entry Using Instrumented Wrist Band

Mouse operation may be performed with the following sequence:
1) Invocation—enabling of the sensors
   a. e.g. double click/pinch of finger, detected by accelerometer
   b. collect initial sensors values
2) Receiving data from sensors
   a. E.g. accelerometer, EMG, and NIR sensors
3) Sensor data validation, impedance check, light reflected check
   a. E.g. for EMG sensors, make sure the impedance is below a set threshold
4) Assign weights to each sets of sensors that are determined by the sensor data validation
5) Preprocessing of data, removal of background, filtering
6) Frame/epoch data if applicable
7) Calculating a measure, e.g. predicted probability from machine learning modeld, or calculating a sum/integrated signal, or amplitude of each sensor signal
8) Applied weights to each set of sensor data
   a. E.g., weight the EMG channel signal to be inversely proportional to the impedance of that channel
9) Compute the coordinates from the weighted measure
   a. Use initial values of the sensors collected from step 1) if applicable
10) Move cursor according to the hand/finger gestures:
    a. E.g. move one direction of the cursor by the rotation/twist of arm and the second directions by a muscle signal, e.g. extension of the thumb or the clenching of first
    b. Or wrist adduction/abduction to move cursor in one direction and use rotation of wrist to move the cursor along the second direction
11) Detect click event
    a. e.g. flexion/extension of the index finger, or the extension of the thumb A three-dimension selection may be performed with the following process:
1) Triple tapping of fingers to initiate the 3-D selection function.
   a. Sensed by accelerometer
2) Move the cursor with wrist as described above. Pinch and hold fingers, e.g. index finger and the thumb, to select the first point to drag.
   a. Using wrist abduction/adduction to move cursor along one direction, e.g. sensed by optical/infrared sensors
   b. Using wrist/forearm rotation to move cursor along second direction, may be sensed by an accelerometer
   c. Using forearm up/down to move cursor along third direction, may be sensed by an accelerometer
3) A cube appears in a 3-d display, e.g. in the augmented reality glasses, drag cursor to make the oppose corner of the cube to a point of interest, using sideways movement of wrist (deviation, abduction/adduction) to move cursor along one direction (e.g. horizontal), using the rotation of the wrist to move the cursor in the second dimension (e.g. up/down direction), and using arm up/down motion to move the cursor in the third direction (further out in distance).
4) Un-pinch (release) the fingers to make the selection
   a. Could be sensed with EMG and/or optical/NIR sensors With a 3-D object or volume selected, the object may be expanded (scaled up or down) with a finger movement. For example, using EMG to sense the thumb extension to control the scale of the object. Alternatively, the user can use the wrist movement sensed by the accelerometer/IMU, e.g., rotation of the wrist and the up/down movement of the wrist, to rotate the selected object.

Single handed text entry operation can be accomplished with the following sequence:
1) Invocation—enabling of the sensors and bring up a virtual keyboard
   b. e.g. double click/pinch of finger, detected by accelerometer
   c. collect initial sensors values
   d. obtain accelerometer orientation
   e. Transform accelerometer axes to a standard orientation
2) Receiving data from sensors
   a. E.g. accelerometer, EMG, and NIR sensors
3) Sensor data validation, impedance check, light reflected check
   a. E.g. for EMG sensors, make sure the impedance is below a set threshold
4) Assign weights to each sets of sensors that are determined by the sensor data validation
5) Preprocessing of data, removal of background, filtering
6) Frame/epoch data if applicable
7) Calculating a measure, e.g. predicted probability from machine learning modeld, or calculating a sum/integrated signal, or amplitude to each set of sensors
8) Applied weights to each set of sensor data
   a. E.g., weight the EMG channel signal to be inversely proportional to the impedance of that channel
9) Compute the coordinates from the measures
   a. Use initial values of the sensors collected from step 1) if applicable
10) Move cursor according to the hand/finger gestures:
    a. E.g. move one direction of the cursor by the rotation/twist of arm and the second directions by a muscle signal, e.g. extension of the thumb or the clenching of first
    b. The second direction can be moved with up/down movement of the forearm, sensed with accelerometer
    c. Or the second direction can be the wrist deviation (adduction and abduction), sensed by NIR/optical methods, capacitive sensing, or EMG, or accelerometer 11) Detect click event
   a. e.g. flexion/extension of the index finger, or the extension of the thumb
12) From the cursor coordinates map to a key on the virtual keyboard
   a. Use language model to
13) Output selected letter or bring up another keyboard view, .e.g if shift key is determined to be pressed
14) Recommend next letter using context and language model Alternatively, for keyboard typing described above, instead of cursor moving, keyboard may move according to the gestures. For single handed operation, one set of sensor signals (e.g. EMG) may be used to move cursor along one direction and second set of sensors (e.g. NIR) for moving cursor along a second direction. A separate event detection of clicking, e.g. accelerometer. For two handed typing, two cursors may be displayed on the virtual keyboard, one driven by one hand.

Other Uses of the Wrist Band for Controlling Computing Devices

The above disclosed methods can be used to control the volume of earphones. An exemplary process may be the following:
1) Double finger taps to enable the sensors on wristband for volume adjustment
   a. The finger tap may be detected by the accelerometer
2) Flexing/extending thumb to increase the volume while flexing/extend index finger to decrease the volume
   a. the finger movement may be detected by EMG and/or NIR sensors
3) Using a single finger tap to turn off the sensors
   a. The finger tap may be detected by the accelerometer An exemplary process for performing a selection of a song to play or a TV channel is the following:
1) Double finger taps to enable the sensors on wrist band for the selection function
2) Flexing/extending thumb to forward the selection and flex index finger to back up the selection
3) Using a single finger tap to select to play
4) Using a double finger tap to turn off the selection function An exemplary process for controlling a presentation on a computing device with a wrist band is the following:
1) Double finger taps to enable the sensors wrist band for the selection function
2) Flexing/extending thumb to forward the presentation and flex index finger to back up the selection
3) Double finger taps to turn off the function In the above examples, the thumb and index finger movement can be sensed by EMG and/or optical/NIR sensors or their combination, and accelerometers, as described in the previous sections. The sensors may also be of capacitive, force, and displacement sensors. The finger tapping can be detected with accelerometers. The processing unit may include signal processing and classification modules.

FIG. 12 is a flowchart of an example process of operating computing devices through sensors on or near a hand, arranged in accordance with at least some embodiments described herein.

Various processes discussed above may be performed by one or more computing devices based on instructions stored in a variety of memory types. While example methods may be executed as discussed herein, various steps of the methods may be removed, replaced, reordered, or new steps added without departing from the principles discussed herein.

The example process 1200 may begin with operation 1210, "INVOCATION DETECTED BY ACCELEROMETERS", where the invocation may, for example, be a double tap, a pinch, etc. Operation 1210 may be followed by operation 1220, "ENABLE MOUSE FUNCTION", which may, for example, include activation of EMG, NIR sensors, etc. Operation 1220 may be followed by operation 1230, "RECEIVE DATA FROM SENSORS", where the sensors may include any of the sensors discussed herein, for example, EMG sensors, optodes, etc. Operation 1230 may be followed by operation 1240, "PREPROCESSING", where the received signals may be preprocessed, such as filtered, amplified, etc. Further processing may result in the operations discussed herein.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for mainly hardware and/or firmware vehicle; if flexibility is paramount, the implementer may opt for mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disk (DVD), a digital tape, a computer memory, a solid state drive (SSD), etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for controlling a cursor on a computer display using wrist embedded multimodal sensors, the method comprising:
    detecting input signals from a plurality of sensors, wherein
        the plurality of sensors is grouped to sense movement of one or more of a wrist, a hand, or a finger, and
        each group comprises at least one sensor dynamically configured to detect one movement;
    preprocessing the detected input signals;
    processing the preprocessed input signals to control one or more of a movement of a cursor along a direction on the computer display and a pointer action through a machine learning algorithm by translating the input signals to the one or more of the movement of the cursor and the pointer action; and
    calibrating the plurality of sensors to increase an accuracy of the plurality of sensors by:

detecting a user-initiated gesture;
  detecting signals from the plurality of sensors during the user-initiated gesture; and
  using the detected signals to apply weights to the plurality of sensors in a spatial filter.

2. The method of claim 1, wherein the pointer action is a click action.

3. The method of claim 1, further comprising:
  activating the calibrating, the preprocessing,. and the processing upon detecting a predefined movement of the one or more of the wrist, the hand, or the finger.

4. The method of claim 1, wherein the computer display is a head mounted display or an augmented reality (AR) display.

5. The method of claim 1, wherein the plurality of sensors include one or more of an electromyogram (EMG) sensor, an optical sensor, an accelerometer, an inertial measurement unit (IMU), a capacitive sensor, a force sensor, a magnetic sensor, an acoustic sensor, or a camera.

6. The method of claim 1, further comprising:
  adaptively configuring one or more of the plurality of sensors through a machine learning model.

7. The method of claim 1, wherein controlling the movement of the cursor along the direction comprises controlling the movement of the cursor linearly, in a 2D plane, or in a 3D space.

8. The method of claim 1, further comprising:
  enabling the plurality of sensors based on a machine learning model trained on usage history.

9. The method of claim 1, further comprising:
  enabling the plurality of sensors based on a received notification.

10. The method of claim 1, wherein the finger includes a thumb, an index finger, a middle finger, a ring finger, and a little finger.

11. A method for text entry on a computer display using wrist worn multimodal sensors, the method comprising:
  detecting input signals from a plurality of sensors, wherein
    the plurality of sensors is grouped to sense movement of one or more of a wrist, a hand, or a finger,
    one or more groups comprise at least one sensor dynamically configured to detect a movement to control a movement of a cursor along a direction on the computer display, and
    one group comprises at least one other sensor configured to detect a click action;
  preprocessing the detected input signals;
  processing the preprocessed input signals to control the movement of the cursor and the click action through a machine learning algorithm by translating the input signals to the one or more of the movement of the cursor and the click action;
  providing a virtual keyboard on the computer display, wherein the movement of the cursor and the click action enable selection of characters and commands on the virtual keyboard; and calibrating the plurality of sensors to increase an accuracy of the plurality of sensors by:
    monitoring the movement of the one or more of the wrist, the hand, or the finger through one or more cameras mounted on a pair of augmented reality (AR) glasses or a wristband housing the plurality of sensors; and
    comparing the detected input signals with the monitored movement of the one or more of the wrist, the hand, or the finger.

12. The method of claim 11, further comprising:
  activating the calibrating, the preprocessing, and the processing upon receiving a notification, based on usage history, or detecting a predefined movement of the one or more of the wrist, the hand, or the finger.

13. The method of claim 11, wherein the computer display is a head mounted display or an augmented reality (AR) display.

14. The method of claim 11, wherein the plurality of sensors include one or more of an electromyogram (EMG) sensor, an optical sensor, an accelerometer, an inertial measurement unit (IMU), a capacitive sensor, a force sensor, a magnetic sensor, an acoustic sensor, or a camera.

15. The method of claim 11, further comprising:
  enabling one handed or two handed use of the virtual keyboard based on user selection.

16. A system for providing computer mouse functionality on a computer display using a wrist band embedded with multimodal sensors, the system comprising:
  a plurality of sensors, wherein
    the plurality of sensors is affixed to a watch and the wristband for the watch,
    the plurality of sensors is grouped to sense a movement of one or more of a wrist, a hand, or a finger, and
    each group comprises at least one sensor dynamically configured to detect the movement to control a movement of a cursor along a direction on the computer display;
  a preprocessing unit configured to preprocess input signals from the plurality of sensors;
  a processor configured to:
    control the movement of the cursor and a pointer action through a machine learning algorithm by translating the input signals to the one or more of the movement of the cursor and the pointer action; and
    calibrate the plurality of sensors by executing a calibration algorithm; and
  an adjustment unit configured to adjust contact tightness for the plurality of sensors based on input from one or more of the plurality of sensors by inflating inflatable structures attached to electrodes through pumping air, pumping a fluid, or heating s fluid in a reservoir, wherein the plurality of sensors comprises electrodes.

17. The system of claim 16, wherein the preprocessing unit is configured to one or more of filter, digitize, or amplify the input signals.

18. The system of claim 16, wherein the processor is further configured to:
  provide a virtual keyboard on the computer display, wherein the movement of the cursor and the pointer action enable selection of characters and commands on the virtual keyboard.

19. The system of claim 16, wherein the processor is further configured to:
  activate the preprocessing unit and process the input signals upon receiving a notification, based on usage history, or detecting a predefined movement of the one or more of the wrist, the hand, or the finger.

20. The system of claim 16, wherein at least a subset of the plurality of sensors are configured to provide redundancy to another subset of the plurality of sensors.

* * * * *